US012647760B2

(12) United States Patent
Ji et al.

(10) Patent No.: US 12,647,760 B2
(45) Date of Patent: Jun. 2, 2026

(54) TERMINAL, A VEHICLE COMMUNICATING WITH A TERMINAL, AND A VEHICLE CONTROL SYSTEM

(71) Applicants:HYUNDAI MOTOR COMPANY, Seoul (KR); KIA CORPORATION, Seoul (KR)

(72) Inventors: Changjin Ji, Gwangmyeong-si (KR); Wonho Lee, Seoul (KR); Dongsuk Lee, Hwaseong-si (KR); Soongmin Chung, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 365 days.

(21) Appl. No.: 18/214,967

(22) Filed: Jun. 27, 2023

(65) Prior Publication Data

US 2024/0098471 A1      Mar. 21, 2024

(30) Foreign Application Priority Data

Sep. 21, 2022    (KR) ......................... 10-2022-0119195

(51) Int. Cl.
| | |
|---|---|
| *H04W 48/18* | (2009.01) |
| *H04W 4/48* | (2018.01) |
| *H04W 4/80* | (2018.01) |
| *G06F 3/01* | (2006.01) |
| *G10L 15/22* | (2006.01) |

(52) U.S. Cl.
CPC .............. *H04W 4/80* (2018.02); *H04W 4/48* (2018.02); *G06F 3/017* (2013.01); *G10L 15/22* (2013.01); *G10L 2015/223* (2013.01)

(58) Field of Classification Search
CPC ......... H04W 4/80; H04W 4/48; H04W 12/50; G06F 3/017; G06F 3/167; G10L 15/22; G10L 2015/223; B60R 16/037; B60R 25/2018; B60R 2325/205; G06K 19/06009; G06K 19/0723
USPC ....................................................... 455/414.1
See application file for complete search history.

(56) References Cited

U.S. PATENT DOCUMENTS

| | | | |
|---|---|---|---|
| 11,535,268 B2 * | 12/2022 | Shin ..................... | G06V 40/165 |
| 2022/0189227 A1 * | 6/2022 | Purohit ............... | G06V 40/172 |
| 2023/0169612 A1 * | 6/2023 | Liguori ................. | G06N 20/00 705/15 |
| 2024/0210962 A1 * | 6/2024 | Dürr .................... | G05D 1/0297 |

* cited by examiner

*Primary Examiner* — Tanmay K Shah
(74) *Attorney, Agent, or Firm* — Lempia Summerfield Katz LLC

(57)                ABSTRACT

A vehicle, a terminal communicating with the vehicle, and a vehicle control system are disclosed. The vehicle control system includes a vehicle having a plurality of control marks provided to match with each of a plurality of electronic devices and a terminal. The terminal is configured to recognize a control mark obtained by a camera or a communication device, display a plurality of control buttons based on the recognized control mark, and transmit information about a control button corresponding to a user input among the plurality of control buttons to the vehicle. The vehicle of the vehicle control system is configured to control an operation of an electronic device matching with the recognized control mark, based on receiving information about the control button corresponding to the user input from the terminal.

20 Claims, 25 Drawing Sheets

MAX
A/C 22.0 AUTO AUTO 20.5

SYNC

300

300

TERMINAL, A VEHICLE COMMUNICATING WITH A TERMINAL, AND A VEHICLE CONTROL SYSTEM

CROSS-REFERENCE TO RELATED APPLICATION

This application is based on and claims priority under 35 U.S.C. § 119 to Korean Patent Application No. 10-2022-0119195, filed on Sep. 21, 2022 in the Korean Intellectual Property Office, the disclosure of which is incorporated herein by reference.

BACKGROUND

1. Technical Field

The present disclosure relates to a terminal for receiving a user input and transmitting the received user input to a vehicle, to a vehicle communicating with the terminal, and to a vehicle control system.

2. Description of the Related Art

In addition to a basic driving function, a vehicle performs additional functions for user convenience, such as an audio function, a video function, a navigation function, air conditioning control, seat control, lighting control, and the like.

Such a vehicle includes an input device for receiving operation commands of various functions and includes an output device for outputting operation states of various functions. The vehicle's input device and output device enable interaction with a user.

The input device may be divided into a physical user interface (PUI) and a graphical user interface (GUI).

The PUI is a device receiving a user input in a physical way, like a keypad, a remote control, a touchpad, and the like. The GUI is a device receiving a user input generated by touching an icon or menu displayed on a display.

A rotary input device among the PUI may be operated without looking at the input device, but it takes a long operation time to move to a location of a desired content icon, and a separate display device is required.

Because such an input device and display device are provided at different locations inside a vehicle, when a user operates the input device and checks the operation information displayed on the display device, the user's gaze is distracted.

A hard key, a button, a lever, a keypad, and a touch screen among the PUI have limitations in receiving operation commands for various functions of a variety of devices and require a large physical space.

Also, the user's operation load is increased to receive operation commands with a few hard keys. Further, a manufacturing cost of the input device is increased because a key light emitting diode (LED) and another key equipment for identifying physical keys at night are required.

SUMMARY

An aspect of the disclosure provides a terminal that may display a control button for operating functions performable in a vehicle in response to a code recognition or near-field communication (NFC) and that may transmit to the vehicle a control signal corresponding to a control button selected by a user.

Another aspect of the disclosure provides a vehicle and a vehicle control system that may recognize a user for each seat and a terminal of each user and that may perform interactions with the terminal for each seat.

Additional aspects of the disclosure are, in part, set forth in the description which follows and should be, in part, apparent from the description or may be learned by practice of the disclosure.

According to an aspect of the disclosure, a vehicle includes a vehicle body in which a plurality of control marks is provided. The vehicle also includes a plurality of electronic devices provided in the vehicle body and provided to match with the plurality of control marks, respectively. The vehicle also includes a communication device configured to communicate with a terminal. The vehicle also includes a processor configured to control, based on receiving a user input corresponding to one control mark of the plurality of control marks from the terminal, an operation of an electronic device matching with the one control mark in response to the received user input.

According to an aspect of the disclosure, each of the plurality of control marks is a quick response (QR) code mark or a near-field communication (NFC) mark. Alternatively, a portion of the plurality of control marks are QR code marks and others are NFC marks and the communication device includes a plurality of NFC communication modules provided around each of the NFC marks and configured to perform NFC communication.

According to an aspect of the disclosure, each of the plurality of control marks includes identification information of the matched electronic device. The user input includes control information for controlling at least one function performed in the electronic device matching with the one control mark.

According to an aspect of the disclosure, the plurality of electronic devices includes at least two of at least one speaker, at least one seat heater, at least one seat ventilation, a steering wheel heater, a display, at least one seat adjustment member, at least one lighting device, or an aft conditioner.

According to an aspect of the disclosure, the vehicle further includes a plurality of seats. The plurality of electronic devices is provided in each of the plurality of seats.

According to an aspect of the disclosure, the plurality of control marks includes a control mark for pairing with the terminal. According to an aspect of the disclosure, the processor of the vehicle is configured to control the at least one speaker, the at least one lighting device, or the display to output information being output from the terminal in response to a pairing command with the terminal.

According to an aspect of the disclosure, the vehicle further includes a camera and a microphone. According to an aspect of the disclosure, the processor of the vehicle is configured to recognize a gesture of a user based on an image of the user obtained by the camera, recognize a voice of the user received by the microphone, and control an operation of at least one electronic device of the plurality of electronic devices based on the recognized gesture and the recognized voice.

According to an aspect of the disclosure, the processor of the vehicle is configured to monitor a user's state based on the image obtained by the camera and the voice received by the microphone. The processor is also configured to control communication with an external device or change destination information based on the monitored user's state.

According to an aspect of the disclosure, the processor of the vehicle is configured to control an operation of at least one of at least one speaker, at least one lighting device, or a display, based on at least one of the monitored user's state or a user's state obtained from the terminal.

According to an aspect of the disclosure, the processor of the vehicle is configured to perform user authentication through an application installed on the terminal and to transfer a control authority of the plurality of electronic devices to the terminal, based on the user authentication being successful.

According to another aspect of the disclosure, a terminal includes an inputter configured to receive a user input, a display, a camera, a communication device configured to communicate with a vehicle, and a processor. The processor is configured to recognize information about a control mark of the vehicle obtained by the camera or the communication device, control the display to display a plurality of control buttons based on the recognized information about the control mark, and transmit information about a control button corresponding to the user input among the plurality of control buttons to the vehicle.

According to another aspect of the disclosure, each of a plurality of control marks matches with each of a plurality of electronic devices provided in the vehicle and includes identification information of a matched electronic device. The user input includes control information for controlling at least one function performed in an electronic device matching with one control mark.

According to another aspect of the disclosure, each of the plurality of control marks is a QR code mark or an NFC mark.

According to another aspect of the disclosure, the plurality of control buttons are buttons for controlling at least one operation of at least one speaker, at least one seat heater, at least one seat ventilation, a steering wheel heater, a display, at least one seat adjustment member, at least one lighting device, or an air conditioner provided in the vehicle.

According to another aspect of the disclosure, the processor of the terminal is configured to transmit at least one of state information of a user or information being output in response to pairing with the vehicle.

According to another aspect of the disclosure, the processor of the terminal includes an application for controlling the vehicle and is configured to perform user authentication through the application, transmit information about the user authentication to the vehicle, and receive a control authority of the vehicle from another terminal through the application.

According to another aspect of the disclosure, the processor of the terminal is configured to update display of a control button in response to addition or removal of an electronic device and to change positions of the plurality of control buttons in response to the user input.

According to another aspect of the disclosure, the processor of the terminal is configured to perform augmented reality (AR) or virtual reality (VR) and to display the plurality of control buttons through the AR or the VR being performed.

According to still another aspect of the disclosure, a vehicle control system includes a terminal and a vehicle having a plurality of control marks provided to match with each of a plurality of electronic devices. The terminal is configured to recognize a control mark obtained by a camera or a communication device, display a plurality of control buttons based on the recognized control mark, and transmit information about a control button corresponding to a user input among the plurality of control buttons to the vehicle. The vehicle of the vehicle control system is configured to control an operation of an electronic device matching with the recognized control mark, based on receiving information about the control button corresponding to the user input from the terminal.

According to still another aspect of the disclosure, each of the plurality of control marks is a QR code mark or an NFC mark.

BRIEF DESCRIPTION OF THE DRAWINGS

These and/or other aspects of the disclosure should become apparent and more readily appreciated from the following description of the embodiments, taken in conjunction with the accompanying drawings, in which:

FIGS. 9A, 9B, and 9C are diagrams illustrating examples of control buttons displayed after obtaining a control mark through a terminal according to an embodiment;

DETAILED DESCRIPTION

Figure 1:
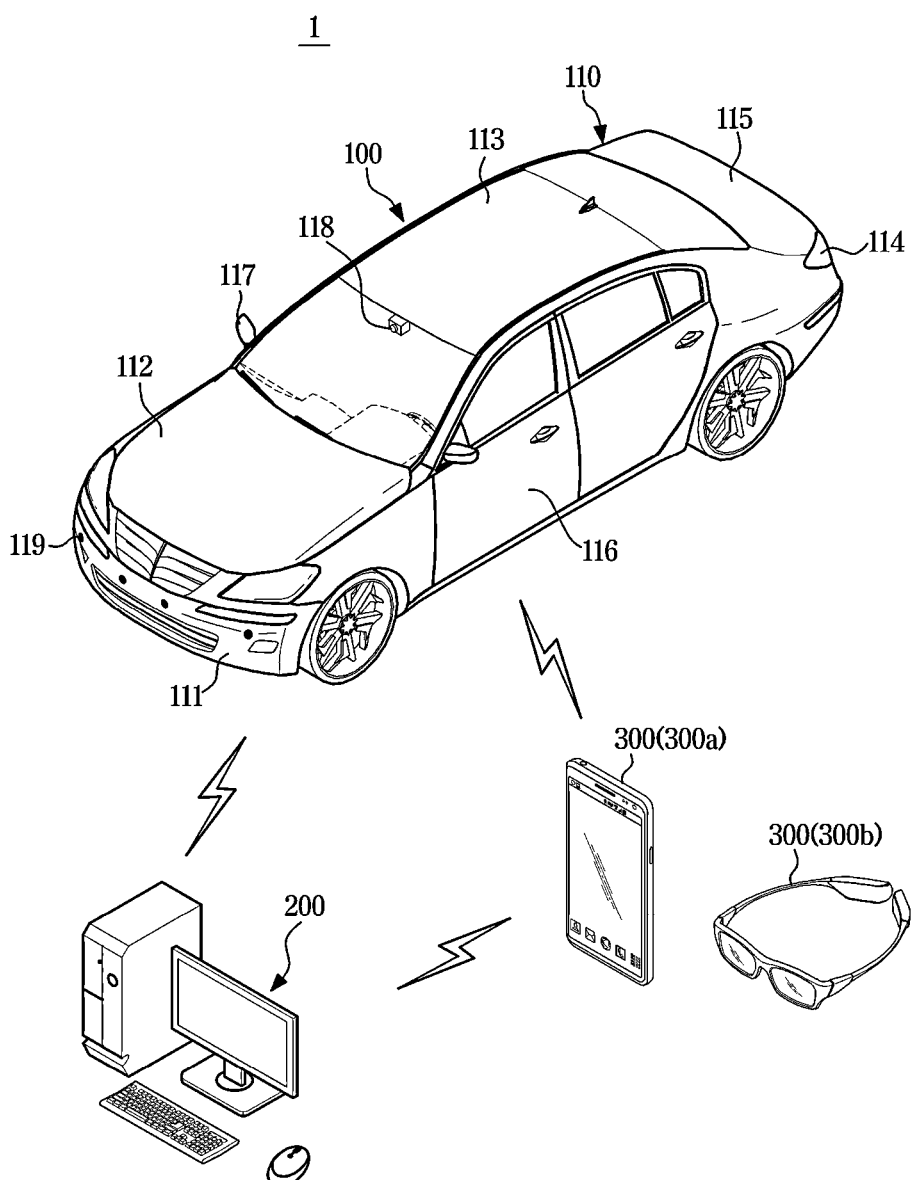
FIG. 1 is a diagram illustrating a configuration of a vehicle control system according to an embodiment.

Like reference numerals throughout the specification denote like elements. Also, this specification does not describe all the elements according to embodiments of the disclosure, and descriptions well-known in the art to which the disclosure pertains or overlapped portions are omitted.

The terms such as "part", "~member", "~module", "~device", and the like may refer to at least one process processed by at least one hardware or software. According to embodiments, a plurality of "~parts", "~members", "~modules", "~devices" may be embodied as a single element, or a single of a "part", "~member", "~module", "~device" may include a plurality of elements. When the "~part", "~member", "~module", "~device", "element", or the like of the present disclosure is described as having a purpose or performing an operation, function, or the like, the part, member, module, device, or element should be considered herein as being "configured to" meet that purpose or to perform that operation or function. Each of the "~part", "~member", "~module", "~device", "element", and the like may separately embody or be included with a processor and a memory, such as a non-transitory computer readable media, as a part thereof.

It should be understood that, when an element is referred to as being "connected" to another element, the element can be directly or indirectly connected to the other element, wherein the indirect connection includes "connection" via a wireless communication network.

It should be understood that the term "include," and variations thereof, when used in this specification, specifies the presence of stated features, integers, steps, operations, elements, and/or components but does not preclude the presence or addition of at least one other features, integers, steps, operations, elements, components, and/or groups thereof.

It should be understood that, although the terms first, second, etc. may be used herein to describe various elements, these elements should not be limited by these terms.

It should be understood that the singular forms are intended to include the plural forms as well, unless the context clearly dictates otherwise.

Reference numerals used for method steps are just used for convenience of explanation but are not intended to limit an order of the steps. Thus, unless the context clearly dictates otherwise, the written order may be practiced otherwise.

Hereinafter, an operation principle and embodiments should be described in detail with reference to the accompanying drawings.

FIG. 1 is a diagram illustrating a configuration of a vehicle control system according to an embodiment.

A vehicle control system 1 may include a vehicle 100, a server 200 communicating with the vehicle 100, and a terminal 300.

The vehicle 100 may be a personal vehicle owned by a user, a shared vehicle capable of being shared via a vehicle sharing service, or a robo-taxi vehicle performing a robo-taxi service.

The vehicle 100 may be a vehicle manually driven in response to a user's driving intention.

The vehicle 100 may be an autonomous vehicle autonomously driven to a destination.

The vehicle 100 may be a vehicle capable of both manual driving and autonomous driving.

The vehicle 100 may communicate with the server 200 and the terminal 300 and may also communicate with an infrastructure (not shown) installed on roads.

The server 200 may store user information, terminal information about a terminal owned by a user, and vehicle information.

The user information may be identification information about a user registered in the server 200 or may be identification information of a terminal owned by the registered user (hereinafter, user's terminal 300). Here, the identification information about the user registered in the server 200, the identification information of the user's terminal 300, and the like may be information registered through a vehicle application (app) installed on the user's terminal 300.

Also, the user information may include a name, an address, an email address, a social security number, a date of birth, driver's license information of a user, and a card number or an account number of the user for payment for a sharing service, which are registered through a sharing application.

The identification information of the user's terminal 300 is unique identification information of the user's terminal 300 distinguished from other terminals and includes at least one of a phone number registered in the user's terminal 300, a Wi-Fi MAC address of the user's terminal 300, a serial number, or an international mobile equipment identity (IMEI).

The identification information of the user's terminal 300 may be a Bluetooth identifier (BTID).

In addition, the user information provided from the user's terminal 300 is user information registered in the sharing application for sharing.

The vehicle information may be information about the vehicle owned by the user, information about a shared vehicle, or information about a robo-taxi. In other words, information of the vehicle 100 may include vehicle usage information, such as information about a personal vehicle, a shared vehicle, a robo-taxi, and the like.

The information of the vehicle 100 may include a vehicle type, vehicle model, identification information (vehicle license plate), power generation method (e.g., hybrid, electric, internal combustion engine, hydrogen, etc.), shift method, and the like, of the vehicle 100.

The server 200 may communicate with the user's terminal 300 and the infrastructure while performing communication with the vehicle 100.

The server 200 may be a server providing the user with at least one of a vehicle control service, a sharing service, or a robo-taxi service.

The server 200 may provide the user's terminal with a vehicle application.

The server 200 may provide the user's terminal with a vehicle sharing application.

The server 200 may provide the user's terminal with a robo-taxi application.

When providing a sharing service, the server 200 may store current location information and vehicle information of a plurality of shared vehicles.

When providing the sharing service, the server 200 may assign shared vehicles based on current location information, destination information, usage time information of the user received through the user's terminal 300. Also, the server 200 may transmit, to an assigned shared vehicle, user information, terminal information, and usage information of the sharing service and may transmit identification information of the assigned shared vehicle and authentication information to use the assigned shared vehicle to the user's terminal 300.

When providing a robo-taxi service, the server 200 may store current location information and vehicle information of a plurality of robo-taxi vehicles.

When providing the robo-taxi service, the server 200 may assign robo-taxi vehicles based on current location information and destination information of the user received through the user's terminal 300. Also, the server 200 may transmit, to an assigned robo-taxi vehicle, the current location information, the destination information, user information, and terminal information of the user and may transmit identification information of the assigned robo-taxi vehicle and authentication information to use the assigned robo-taxi vehicle to the user's terminal 300.

When providing the sharing service, the server 200 may transmit information about a control authority of a vehicle (hereinafter, vehicle control authority information), to the vehicle 100 and to the user's terminal 300.

When providing the robo-taxi service, the server 200 may transmit control authority information controllable by the user to the user's terminal 300.

The server 200 may transmit cost information about a cost of using a sharing service and a robo-taxi service to the user's terminal 300.

The user's terminal 300 may receive and store an electronic key including control authority information of the vehicle 100. In other words, the electronic key may include control authority information for controlling at least one of electronic devices of the vehicle 100.

The electronic key may include authentication information for user authentication.

For example, the user's terminal 300 may change a vehicle door to a locked state or an unlocked state by remotely controlling a state of a first locking member using the stored electronic key and may change a vehicle's tailgate to a locked state or an unlocked state by remotely controlling a state of a second locking member using the stored electronic key.

The user's terminal 300 may control at least one function performable in the vehicle 100 using the stored electronic key. Here, a function is an operation performed by at least one of a plurality of electronic devices provided in the vehicle and refers to providing an output by performing the operation.

The user's terminal 300 may include an application for controlling the vehicle owned by the user and may include an application for using a sharing service or a robo-taxi service.

Here, the user's terminal 300 may be implemented as a computer or a portable terminal capable of accessing the vehicle through a network.

Here, the computer may include, for example, a laptop, a desktop, a tablet personal computer (PC), a slate PC, and the like, equipped with a web browser. The portable terminal may include, for example, all kinds of handheld-based wireless communication devices that guarantee portability and mobility. Examples of these communication devices include a personal communication system (PCS), a global system for mobile communication (GSM), a personal digital cellular (PDC), a personal handyphone system (PHS), a personal digital assistant (PDA), an international mobile telecommunication (IMT)-2000, a code division multiple access (CDMA)-2000, a wideband CDMA (WCDMA), a wireless broadband Internet (WiBro) terminal 300*a*, and a smartphone. These communication devices may also include a wearable device 300*b*, such as a watch, ring, bracelet, anklet, necklace, eyeglasses, contact lenses, or head-mounted-device (HMD), and the like.

Hereinafter, constituent components of the vehicle 100, the server 200, and the terminal 300 of the vehicle control system 1 are described in greater detail.

The vehicle 100 includes a vehicle body having an exterior and an interior and includes a chassis where mechanical devices for driving are installed as a remaining portion except for the vehicle body.

As shown in FIG. 1, an exterior 110 of the vehicle 100 includes a front panel 111, a bonnet 112, a roof panel 113, a rear panel 114, a tailgate 115, a plurality of doors 116, and window glass provided to each of the doors 116 to be able to be opened and closed.

A first locking member 132 (refer to FIG. 4) and a second locking member 133 (refer to FIG. 4) may be provided in the doors 116 and the tailgate 115 for locking and unlocking, respectively.

The vehicle 100 may further include a side mirror 117 for providing a rear view of the vehicle 100 and a mirror adjustment member (not shown) for folding or unfolding the side mirror 117.

The vehicle 100 may further include an external camera 118 for obtaining a surrounding image. The surrounding image may be an image of an outside of the vehicle.

The external camera 118 may include at least one camera.

The external camera 118 may include a plurality of lenses or image sensors. The image sensors may include a plurality of photodiodes converting light into an electrical signal, and the plurality of photodiodes may be arranged in a two-dimensional (2D) matrix.

The external camera 118 may include a charge-coupled device (CCD) or complimentary metal-oxide-semiconductor (CMOS) image sensor, and a three-dimensional (3D) space recognition sensor, such as a KINECT (RGB-D sensor), Time of Flight (TOF), stereo camera, etc.

The external camera 118 may include at least one rotatable external camera. The external camera 118 may include a camera of a monitoring device (a surround view monitor (SVM) or an around view monitor (AVM)), a camera of a blind spot detection (BSD), or a camera of a rear detection device.

The external camera 118 may be a wide angle camera.

The external camera 118 may include a plurality of external cameras obtaining images in front, rear, left and right directions of the vehicle 100, i.e., images in different directions of the vehicle 100. The plurality of external cameras may have different viewing angles.

The external camera 118 may be provided on a front windshield glass inside the vehicle to face an outside of the vehicle, provided on a rear-view mirror inside the vehicle to face the outside of the vehicle, or provided to be exposed to the outside of the vehicle on a license plate of the front panel, grille, emblem, the front panel, or on the roof panel.

The external camera 118 may be provided on a rear window glass inside the vehicle to face the outside of the vehicle, provided on the tailgate, or provided to be exposed to the outside of the vehicle on a license plate of the rear panel, emblem, the roof panel, or the real panel.

Here, the external camera 118 may be a front camera and may include a dashboard camera, a camera of an autonomous driving control device for autonomous driving, and a camera for obstacle detection.

The external camera 118 may be a rear camera, such as a parking assistance camera.

A distance detector 119 may detect obstacle information about an obstacle around the vehicle 100.

A plurality of distance detectors 119 may be provided.

The distance detector 119 may be provided on a grille, the front panel, or the rear panel of the vehicle 100 and may also be provided on left and right side sill panels of the vehicle body.

The distance detector 119 may include at least one of a light detection and ranging (lidar) sensor, a radar sensor, or an ultrasonic sensor.

At least one lidar sensor may be provided. At least one radar sensor may be provided. At least one ultrasonic sensor may be provided.

Figure 2:
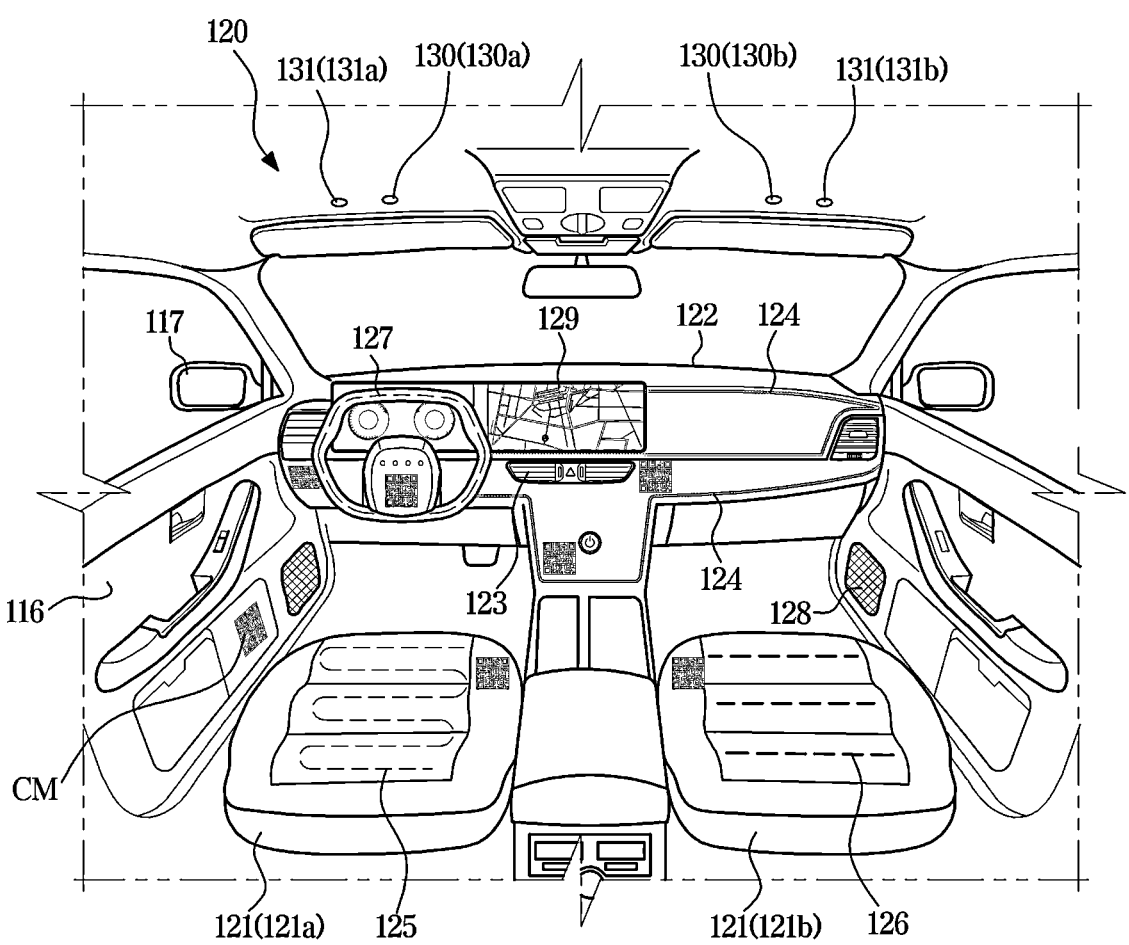
FIG. 2 is a diagram illustrating an example of an interior of a vehicle according to an embodiment.

As shown in FIG. 2, an interior 120 of the vehicle 100 may include seats 121 for an occupant to sit on, a dashboard 122, an air conditioner 123, and a lighting device 124 provided on at least one of the dashboard, a headliner or an inside of vehicle door.

The seats 121 may be divided into a driver's seat 121a, a passenger seat 121b, and rear seats 121c and 121d based on its arrangement. A seat adjustment member 134 (refer to FIG. 4) may be provided in each of the seats 121 to adjust a distance to the dashboard based on the dashboard 122, a height, and a backrest angle.

A seat heater 125 may be provided in each of the seats 121.

A seat ventilation 126 may be provided in each of the seats 121.

The vehicle may further include a steering wheel heater 127 in a steering wheel.

The vehicle may include a speaker 128 for outputting an audio signal, and a display 129 for outputting an image signal.

At least one speaker 128 may be provided.

Figure 3:
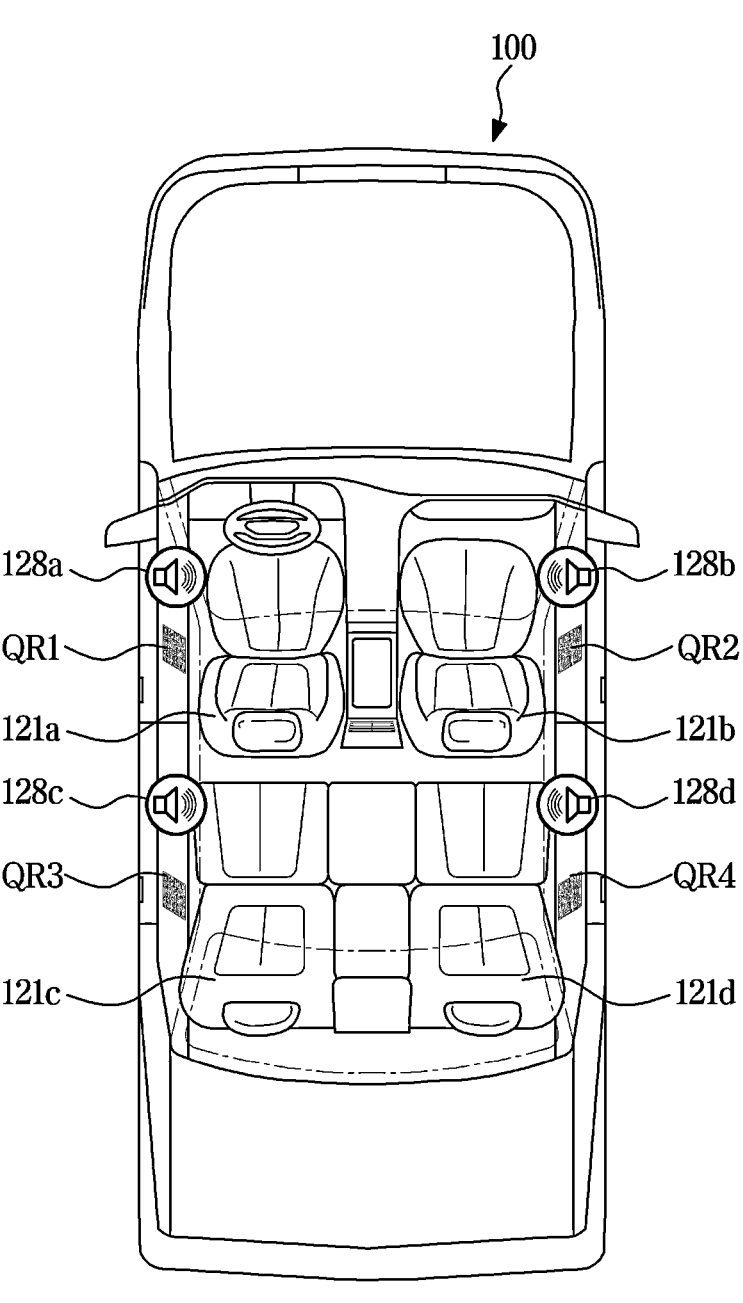
FIG. 3 is a diagram illustrating an example of a speaker and a control mark for each seat provided in a vehicle according to an embodiment.

When a plurality of speakers 128 are provided, as shown in FIG. 3, the plurality of speakers 128 (128a, 128b, 128c and 128d) may be provided around each of the seats 121 (121a, 121b, 121c and 121d).

The vehicle 100 may include the first display 129 for displaying image information.

The vehicle 100 may further include an internal camera 130 for obtaining image information about an inside of the vehicle and a microphone 131 for receiving an audio signal and a voice signal inside the vehicle.

At least one internal camera 130 may be provided.

When two or more internal cameras 130 are provided, the internal camera 130 may include a first internal camera 130a provided above the driver's seat 121a in a headliner area and may include a second internal camera 130b provided above the passenger seat 121b in the headliner area.

At least one microphone 131 may be provided.

When a single microphone 131 is provided, the microphone 131 may be a directional microphone or a microarray phone.

When two or more microphones 131 are provided, the microphone 131 may include a first microphone 131a provided above the driver's seat 121a in the headliner area and may include a second microphone 131b provided above the passenger seat 121b in the headliner area.

The vehicle 100 may further include a start button. When it is determined that a user has a control authority for driving, the vehicle activates the start button, and when the start button is on, controls ignition.

The vehicle 100 may perform user authentication and may transfer a control authority to a user successfully authenticated.

The vehicle 100 may perform terminal authentication and may control an operation of at least one electronic device based on a user input received through the successfully authenticated terminal 300.

Also, when the start button is turned on during communication with the user's terminal 300 whose authentication is completed, the vehicle 100 may control ignition.

In the interior of the vehicle, a control mark (CM) may be provided.

At least one control mark may be provided.

The control mark may include at least one of a barcode mark, a quick response (QR) code mark, or a near-field communication (NFC) mark.

When a plurality of control marks is provided in the vehicle, a portion of the control marks may be QR code marks, and the others may be NFC marks.

The control marks may be provided around electronic devices controllable by the user.

Each of the plurality of control marks may be provided to match with each of the plurality of electronic devices.

At least one electronic device may be provided.

The plurality of electronic devices may include at least two of the speaker 128, the first display 129, the start button, the air conditioner 123, the seat heater 125, the seat ventilation 126, the steering wheel heater 127, the lighting device 124, or the seat adjustment device.

When the plurality of control marks is provided, each of the plurality of control marks may be provided around each of the electronic devices.

For example, the plurality of control marks may be provided around the speaker 128, the first display 129, the air conditioner 123, the seat heater 125, the seat ventilation 126, the steering wheel heater 127, the lighting device 124, or the seat adjustment device.

Also, a control mark for starting may be provided around the start button or on a spider side of the steering wheel.

When the control mark is a QR code mark, each of a plurality of QR code marks may be provided around each of the plurality of electronic devices. In this case, the plurality of QR code marks may have code information different from each other. Each of the plurality of QR code marks may include identification information and location information of a matched electronic device.

When the control mark is an NFC mark, an NFC communication module capable of performing NFC communication may be provided on or around a location where the NFC mark is located.

When the control mark is an NFC mark, each of a plurality of NFC marks may be provided around each of the plurality of electronic devices. In this case, the NFC communication module provided adjacent to each of the plurality of NFC marks may include identification information of the NFC communication module.

Each of the NFC communication modules may store identification information and location information of a matched electronic device and may transmit a radio frequency (RF) signal corresponding to the stored information to the terminal 300.

As shown in FIG. 3, when the plurality of speakers 128 (128a, 128b, 128c and 128d) are provided in the vehicle, each of the plurality of QR code marks may be provided around each of the plurality of speakers 128 (128a, 128b, 128c and 128d).

In other words, QR code marks QR1, QR2, QR3, and QR4 may be provided around the plurality of speakers 128a, 128b, 128c and 128d, respectively.

The plurality of QR code marks may include identification information and location information of a matched electronic device.

The QR code marks QR1, QR2, QR3, and QR4 provided around each of the speakers 128a, 128b, 128c, and 128d may be scanned by a terminal of a user who sits on a seat located adjacent to each of the speakers 128a, 128b, 128c, and 128d. Afterwards, each of the speakers 128a, 128b, 128c, and 128d may be controlled by a terminal of a user sitting on each seat.

Figure 4:
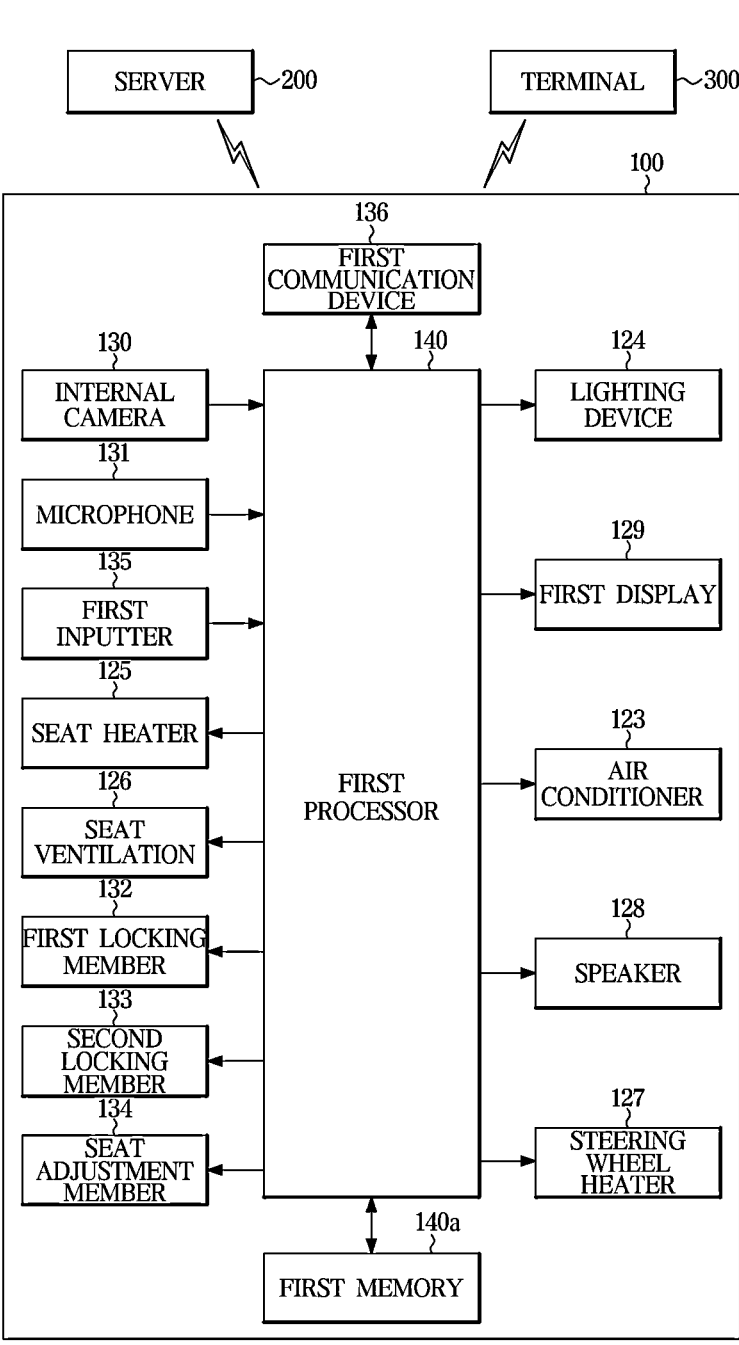
FIG. 4 is a control block diagram illustrating a vehicle according to an embodiment.

FIG. 4 is a control block diagram illustrating a vehicle according to an embodiment.

The vehicle 100 includes the air conditioner 123, the lighting device 124, the seat heater 125, the seat ventilation 126, the steering wheel heater 127, the speaker 128, the first display 129, the internal camera 130, the microphone 131, the first locking member 132, the second locking member 133, the seat adjustment member 134, a first inputter 135, a first communication device 136, a first processor 140, and a first memory 140a.

Constituent components of the vehicle 100 having the same name as those of the terminal 300 and the server 200 are referred to as "first" component to differentiate.

Because the air conditioner 123, the lighting device 124, the seat heater 125, the seat ventilation 126, the steering wheel heater 127, the speaker 128, the internal camera 130, and the microphone 131 have been described with reference to FIG. 2, redundant descriptions thereof are omitted.

The air conditioner 123, the lighting device 124, the seat heater 125, the seat ventilation 126, the steering wheel heater 127, the speaker 128, the first display 129, and the seat adjustment member 134 may operate in response to a user input received from the terminal 300.

The user input received from the terminal 300 may include control information for controlling operations of an electronic device matching with any one control mark.

The user input received from the terminal 300 may be received through the first communication device 136 and the processor 140 and then may be transmitted to each electronic device.

The lighting device 124 may be provided on at least one of a dashboard, a steering wheel, a center fascia, a headliner, or inside of door.

The lighting device 124 may be turned on or off in response to a control command of the processor 140.

The lighting device 124 may adjust a brightness and change a color of the lighting device 124 in response to a control command of the processor 140.

The first display 129 may display an image in response to the user input received from the terminal 300. For example, the first display 129 may display broadcast information, content information, navigation information, audio information and radio information.

The first locking member 132 may change a door to a locked state or unlocked state through communication with the terminal 300 or a remote controller.

The first locking member 132 may be provided in each of a plurality of doors.

The second locking member 133 may be provided in a tailgate.

The second locking member 133 change the tailgate to a locked state or unlocked state through communication with the terminal 300 or a remote controller.

The seat adjustment member 134 may be provided in each of the driver's seat 121a and the passenger seat 121b.

The seat adjustment member 134 may be provided in a rear seat.

The seat adjustment member 134 may adjust a position of each seat in response to a control command of the processor. Here, the control command of the processor may be a user input received from the terminal 300.

The seat adjustment member 134 may adjust a distance to the dashboard based on the dashboard, a height, and a backrest angle in response to the user input.

The first inputter 135 receives a user input. Here, the user input may be an input required for vehicle driving control.

For example, the first inputter 135 may include a start button, a turn signal indicator lever, an external lamp on/off indicator lever, a brake pedal, an accelerator pedal, a wiper lever, and the like.

The first communication device 136 may communicate with at least one of the server 200, the terminal 300, or a global positioning system (GPS) satellite.

The first communication device 136 may include at least one constituent component enabling communication between an external device and electronic devices of the vehicle, for example, at least one of a short-range communication module, wireless communication module, or a wired communication module.

The short-range communication module may include a variety of short-range communication modules that transmit and receive signals in a short distance using a wireless communication network, such as a Bluetooth module, infrared communication module, radio frequency identification (RFID) communication module, wireless local access network (WLAN) communication module, near-field communication (NFC) communication module, Zigbee communication module, and the like.

The wired communication module may include various wired communication modules, such as a controller area network (CAN) communication module, local area network (LAN) module, wide area network (WAN) module, value added network (VAN) module, or the like, and may also include various cable communication modules such as a universal serial bus (USB), high definition multimedia interface (HDMI), digital visual interface (DVI), recommended standard 232 (RS-232), power line communication, plain old telephone service (POTS), or the like.

The wireless communication module may include wireless communication modules that support a variety of wireless communication methods such as a global system for mobile communication (GSM), code division multiple access (CDMA), wideband CDMA (WCDMA), universal mobile telecommunications system (UMTS), time division multiple access (TDMA), long term evolution (LTE), and the like, in addition to a Wifi module and a Wibro module.

The first communication device 136 may further include a location receiver for recognizing current location information of the vehicle.

The location receiver includes a GPS receiver and a signal processing part for processing a GPS signal obtained by the GPS receiver. Here, the signal processing part includes a software obtaining a current location of the vehicle using distance information and time information corresponding to location signals of a plurality of GPS satellites and includes an outputter that outputs the obtained location information of the vehicle.

The first processor 140 may perform user authentication and, when the user authentication is successful, the first processor 140 may control communication with the terminal 300.

The first processor 140 may perform user authentication through an application installed on the terminal. The first processor 140 may transfer a control authority of a plurality of electronic devices to the terminal, when the user authentication is successful through the terminal 300.

The first processor 140 may recognize a user's face based on image information of a user obtained by the internal camera 130 and may perform user authentication based on face information of the recognized face and face information stored in the first memory 140a.

The first processor 140 may recognize a user's voice based on voice information of the user obtained by the microphone 131 and may perform user authentication based on the voice information of the recognized voice and voice information stored in the first memory 140*a*.

The first processor 140 may perform user registration for user authentication using the face information or voice information of the user and may store the face information or the voice information of the user obtained at the time of registration in the first memory 140*a*.

The first processor 140 may also perform user authentication based on at least one of fingerprint information, iris information, or vein information.

The first processor 140 may also communicate with the terminal 300 and receive user authentication information from the terminal 300.

When communicating with the terminal 300, the first processor 140 may control an operation of at least one electronic device provided in the vehicle 100 in response to a user input received from the terminal 300.

The user input received from the terminal 300 may include control information for controlling operations of the at least one electronic device provided in the vehicle.

The first processor 140 may control pairing to perform Bluetooth communication with the terminal 300.

The first processor 140 may transmit a pairing request signal to the terminal 300, when pairing with the terminal 300. Also, the first processor 140 may transmit, to the terminal 300, a signal requesting for provision of user information registered in an application of the terminal 300 and may transmit a signal requesting for provision of identification information of the terminal 300.

The first processor 140 may allow the user information and the identification information of the terminal 300 received from the terminal 300 to be stored.

When the pairing request signal is received from the terminal 300, the first processor 140 may control pairing with the terminal 300 in response to the received pairing request signal.

When a control mark is an NFC mark, based on a determination that the terminal 300 is in contact with or close to the NFC mark, the first processor 140 may control pairing with the terminal 300 through NFC communication.

When it is determined that an authentication number stored in the first memory 140*a* and an authentication number transmitted from the terminal 300 are identical to each other, the first processor 140 may determine that pairing is successful. When it is determined that the authentication number stored in the first memory 140*a* is different from the authentication number transmitted from the terminal 300, the first processor 140 may determine that pairing has failed.

When pairing with the terminal 300 is successful, the first processor 140 may control at least one electronic device provided in the vehicle to output information being output form the terminal 300. Here, the at least one electronic device may include the at least one speaker, the at least one lighting device, and the first display.

For example, in a state where an audio signal is being output through the terminal 300, when pairing with the terminal 300 is successful, the first processor 140 may control the at least one speaker 128 provided in the vehicle to output the audio signal being output from the terminal 300. In this instance, a speaker of the terminal may stop outputting the audio signal.

In a state where an audio signal and an image signal are being output through the terminal 300, when pairing with the terminal 300 is successful, the first processor 140 may control the at least one speaker 128 and the first display 129 provided in the vehicle to output the audio signal and the image signal being output from the terminal. In this instance, the speaker (not shown) and a third display of the terminal may stop outputting the audio signal and the image signal.

When an ignition ON command is received from the terminal 300, the first processor 140 may control start of the vehicle. When an ignition OFF command is received from the terminal 300, the first processor 140 may control turning off the vehicle.

When a user input corresponding to any one control mark of a plurality of control marks is received from the terminal 300, the first processor 140 may control an operation of an electronic device matching with the one control mark in response to the received user input.

Here, each of the plurality of control marks may include identification information of the matched electronic device. The user input may include control information for controlling at least one function performed in the electronic device matching with the one control mark.

For example, when a user input corresponding to a control mark provided around the air conditioner 123 is received from the terminal 300, the first processor 140 may control a target temperature, air volume, and wind direction of the air conditioner 123 in response to the received user input.

As another example, when a user input corresponding to a control mark provided around the seat heater 125 is received from the terminal 300, the first processor 140 may control turning on or off, and may control a target temperature of, the seat heater 125 in response to the received user input.

As still another example, when a user input corresponding to the control mark QR3 provided around the speaker 128*c* of the rear left seat 121*c* is received from the terminal 300, the first processor 140 may control turning on or off, and may control a sound level of, the speaker 128*c* of the rear left seat 121*c* in response to the received user input. (refer to FIG. 3)

When a single directional speaker is provided, based on receiving a user input corresponding to a control mark provided around the rear left seat 121*c* from the terminal 300, the first processor 140 may control a sound output direction of the speaker in response to the received user input.

As yet another example, when an air vent of the air conditioner is provided for each seat, based on receiving a user input corresponding to a control mark provided around the air vent of the rear left seat 121*c* from the terminal 300, the first processor 140 may control an operation of the rear left seat 121*c* in response to the received user input.

As further example, when a user input corresponding to a control mark provided around the steering wheel or start button is received, the first processor 140 may control turning on or off the vehicle in response to the received user input.

When an electronic device is added inside the vehicle, the first processor 140 may transmit information about the addition of the electronic device to the terminal 300. When an electronic device is removed from the vehicle, the first processor 140 may transmit information about the removal of the electronic device to the terminal 300.

When a user input received from the terminal 300 is an execution command of a navigation mode, the first processor 140 may search for a route based on current location information, destination information, and map information and may control the first display to display route information and route guidance information about the retrieved route.

The first processor 140 may recognize a voice (speech) received by the microphone 131, may confirm a user input corresponding to the recognized voice, and may control an operation of at least one electronic device based on the confirmed user input.

More specifically, after user authentication is completed, the first processor 140 may recognize the voice received by the microphone 131 and may determine whether the recognized voice is a trigger word for voice recognition. When it is determined that the recognized voice is a trigger word, the first processor 140 may operate a voice recognition mode for controlling at least one electronic device.

When it is determined that the trigger word is recognized, the first processor 140 may recognize the voice received through the microphone and may extract feature vectors included in a voice signal by calculating frequency characteristics of the voice signal for each frame during voice recognition. Also, the first processor 140 may compare a vector string of the extracted feature vectors with a pre-stored acoustic model to identify phonemes in the voice signal and may convert the identified phonemes into context, thereby recognizing the voice.

Here, a vector string of feature vector for each phoneme is stored in the acoustic model.

The first processor 140 may confirm a matching rate by matching reference context information for each operation command of an electronic device with the converted context information. When it is determined that reference context information with the confirmed matching rate equal to or greater than a reference matching rate exists, the first processor 140 may determine that the voice recognition is successful. Also, the first processor 140 confirms the reference context information with the confirmed matching rate equal to or greater than the reference matching rate and then confirms an operation command of an electronic device corresponding to the confirmed reference context information.

In other words, the first processor 140 may confirm whether an operation command corresponding to the recognized voice exists.

When it is not determined that reference context information with a matching rate equal to or greater than the reference matching rate exists in a state where no signal is received for a preset period of time, the first processor 140 may determine that misrecognition occurs and may control an output of information about misrecognition.

The first processor 140 may confirm an electronic device corresponding to the recognized voice, may control information of the electronic device, and may transmit the control information of the confirmed electronic device to the electronic device.

For example, a voice (speech) for controlling an operation of the air conditioner may include 'cool the vehicle down', 'warm the vehicle up', 'raise the temperature', 'set the temperature to X', 'change the wind direction', 'increase air volume', and the like.

As another example, a voice (speech) for controlling an operation of a media device, such as an audio, a radio, and a display, may include 'turn on the radio', 'play music', 'volume up', 'volume down', 'terminal mirroring', and the like.

The first processor 140 may end the voice recognition mode, when it is determined that a recognized voice corresponds to an end word for ending the voice recognition mode.

The first processor 140 may recognize a user's gesture based on image information of the user obtained by the internal camera 130, may confirm a user input corresponding to the recognized gesture, and may control an operation of at least one electronic device based on the confirmed user input.

More specifically, the first processor 140 may recognize the user's gesture based on the user image obtained by the internal camera 130 and may determine whether the recognized gesture is an initiation gesture for gesture recognition. When it is determined that the recognized gesture is the initiation gesture, the first processor 140 may control an activation of a gesture recognition mode for controlling at least one electronic device.

When the gesture recognition mode is in operation, the first processor 140 may obtain a shape and movement of the user's body (head, arm, lip, and the like), may recognize a gesture corresponding to the obtained shape and movement, and may confirm an electronic device corresponding to the recognized gesture and control information of the electronic device.

The first processor 140 may also confirm a location where the user's hand is recognized and may determine an electronic device to be controlled based on the confirmed location.

For example, when a gesture of two claps is recognized, the first processor 140 may turn on the air conditioner. When a hand gesture of V sign is recognized, the first processor may turn on the seat heater.

The first processor 140 may monitor a state of the user based on image information obtained by the internal camera 130 and voice information received by the microphone 131 and may control communication with an external device based on the monitored user's state.

Here, the external device may include at least one of a server of a police station, a server of fire station, a server of emergency medical sensor, a pre-registered terminal, or another vehicle.

For example, when it is determined that the monitored user's state is in an abnormal state, the first processor 140 may transmit a rescue signal to the server 200, a hospital, a police station, a fire station, or the like and may control a vehicle horn and an emergency light to be operated and turned on.

The abnormal state may include a state in which the user is unconscious, a state in which the user is sleeping for a predetermined period of time or more, and a state in which the user is injured.

Also, the vehicle may further include at least one sensor for monitoring the user's state. For example, the vehicle may include a pressure sensor detecting a pressure of tapping or the user hand's pressure on the steering wheel.

When it is determined that the monitored user's state is in the abnormal state or injured state, the first processor 140 may change destination information based on the user's state, may search for a route based on the changed destination information and current location information, and may control autonomous driving to the changed destination from the current location based on the retrieved route.

The first processor 140 may also monitor user's emotion state based on the image information obtained by the internal camera 130 and the voice information received by the microphone 131.

Here, the emotion state may include an angry state, an excited state, an annoyed state, a disappointed state, a frustrated state, a depressed state, a nervous state, a bored state, and a tired state.

When a navigation mode is in operation, the first processor 140 may search for a new route to a destination based on the user's emotion state and may control an output of navigation information matching with the new route. When a music playback mode is in operation, the first processor 140 may confirm a music genre corresponding to the user's emotion state and may control playback of music of the confirmed genre.

The first processor 140 may confirm a brightness and a color of the lighting device corresponding to the user's emotion state and may control an operation of the lighting device to be adjusted to the confirmed brightness and color. Also, the first processor 140 may adjust a sensitivity of the brake pedal based on the user's emotion state.

The first processor 140 may receive the user's emotion state from the terminal 300.

The first processor 140 may control at least one operation of the at least one speaker, the at least one lighting device, or the first display based on the user's emotion state.

When a sharing service is provided, the first processor 140 receives user information, terminal information of the user's terminal, and destination information from the server 200 and performs user authentication. When the user authentication is successful, the first processor 140 transfers a control authority of the plurality of electronic devices provided in the vehicle to the terminal. The first processor 140 may control an operation of at least one electronic device in response to a user input received from the terminal.

When a robo-taxi service is provided, the first processor 140 receives, from the terminal 300, user information, identification information of the terminal, current location information of the terminal and destination information. The first processor 140 generates a route based on the current location information of the terminal and current location information of the vehicle and controls autonomous driving from the current location of the vehicle to the current location of the terminal based on the generated route. Also, the first processor 140 performs user authentication and, when the user authentication is successful, the first processor 140 generates a route from the current location of the terminal to the destination based on the current location information of the terminal and the destination information and also controls autonomous driving from the current location of the terminal to the destination based on the generated route.

Here, the current location of the terminal may be a current location of the user.

When the robo-taxi service is provided, the first processor 140 transfers a control authority of the plurality of electronic devices provided in the vehicle to the terminal 300. The first processor 140 may control an operation of at least one electronic device in response to a user input received from the terminal 300.

When the robo-taxi service is provided and the control authority of the vehicle transferred to a first terminal is shared with a second terminal, the first processor 140 may control an operation of at least one electronic device in response to a user input received from the second terminal.

The first processor 140 may be implemented as a memory (not shown) that stores an algorithm for controlling operations of constituent components of the vehicle or data about a program that reproduces the algorithm. The first processor 140 may be implemented as a processor (not shown) that performs the above-described operations using the data stored in the memory. In this instance, the memory and the processor may be provided as one chip or provided as separate chips.

At least one constituent component may be added or omitted corresponding to the performance of the constituent components of the first processor 140 illustrated in FIG. 4. Also, it should be easily understood by those having ordinary skill in the art that mutual positions of the constituent components may be modified corresponding to the performance or structure of the constituent components.

Figure 5:
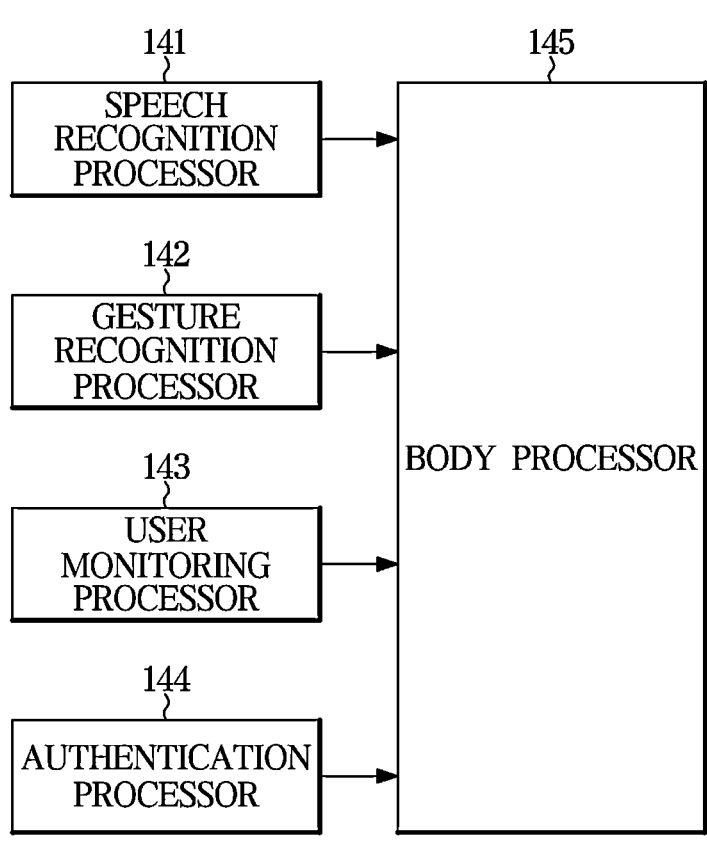
FIG. 5 is a detailed block diagram illustrating a processor of a vehicle according to an embodiment.

As shown in FIG. 5, the first processor 140 may include a voice recognition processor 141 for voice recognition, a gesture recognition processor 142 for gesture recognition, a user monitoring processor 143 for monitoring a user's state, and an authentication processor 144 for user authentication. Also, the first processor 140 may further include a body processor 145 controlling at least one electronic device based on processing information of the voice recognition processor 141, the gesture recognition processor 142, the user monitoring processor 143, and the authentication processor 144.

The first memory 140a may store an operation command of an electronic device corresponding to a gesture, an operation command of an electronic device corresponding to a voice, and information about a trigger word and an initiation gesture.

The first memory 140a may store user information for user authentication and identification information of terminal.

The first memory 140a may store map information, a phone number related to an emergency contact, and a link address of web page related to a police station or fire station.

The first memory 140a stores a contact number and an email address of a user and stores contact numbers and email addresses of people registered by the user.

The first memory 140a may store information about colors and brightness of lighting device corresponding to a user's emotion state.

The first memory 140a may store identification information of a plurality of control marks and may store identification information of an electronic device corresponding to each of the plurality of control marks.

The first memory 140a may be implemented with at least one of a volatile memory, such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a hard disk drive (HDD), or a compact disc read only memory (CD-ROM), without being limited thereto.

The first memory 140a and the first processor 140 may be integrated into one chip or provided in physically separated locations.

Figure 6:
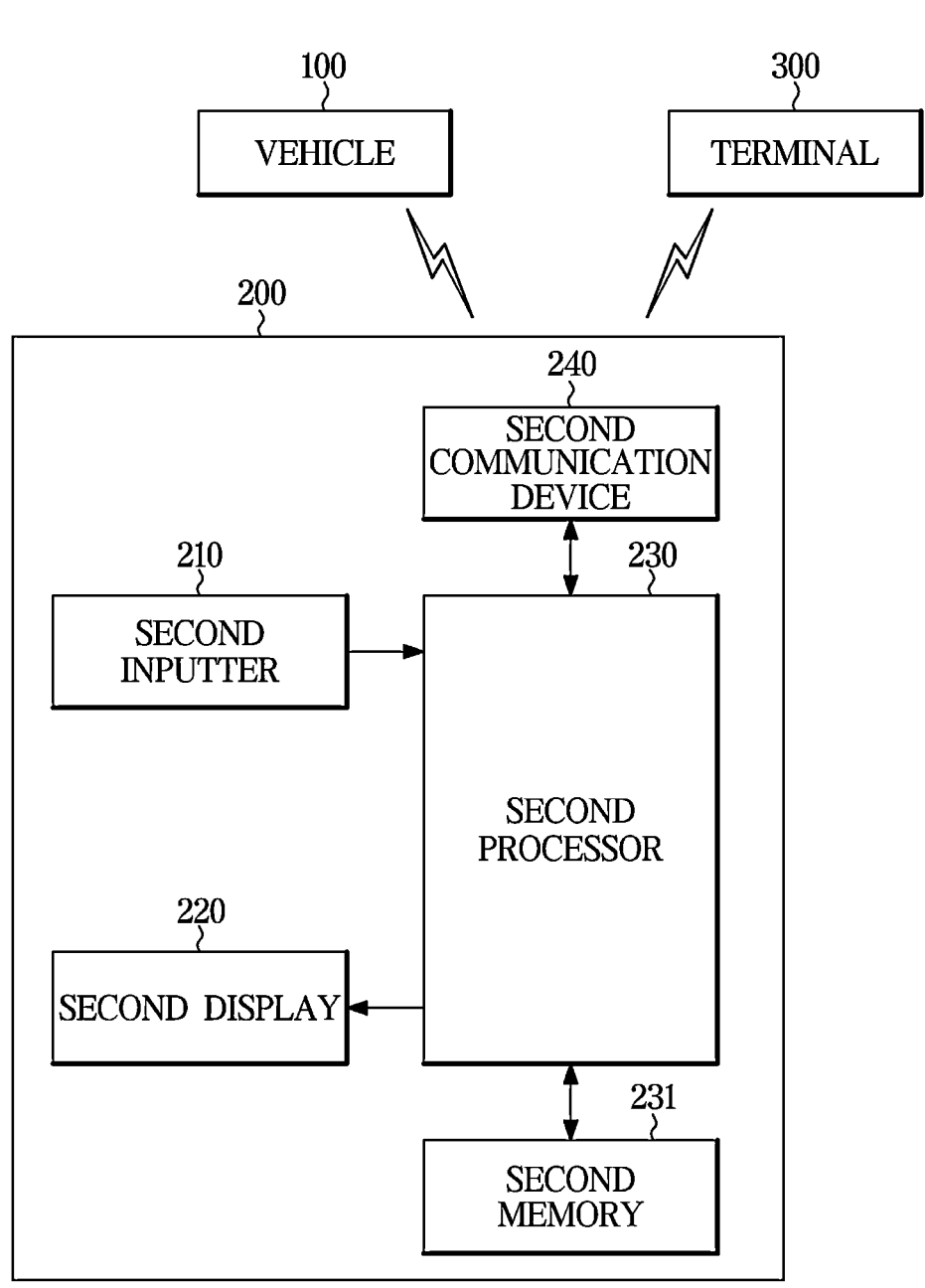
FIG. 6 is a control block diagram illustrating a server according to an embodiment.

FIG. 6 is a control block diagram illustrating a server according to an embodiment.

The server 200 includes a second inputter 210, a second display 220, a second processor 230, a second memory 231, and a second communication device 240.

Constituent components of the server 200 having the same name as those of the terminal 300 and the vehicle 100 are referred to as "second" component to differentiate.

The server 200 may be a server of an application (i.e., app) providing a service associated with the vehicle 100 and may be a telematics server or platform server.

The application may be an application program for interoperating with the vehicle 100 or may be an application program providing a remote service for remotely controlling the vehicle 100.

The second inputter 210 receives a user input. Here, the user input may be an input from a server administrator.

The second inputter 210 may receive user information, terminal information, and vehicle information.

The second display 220 may display information corresponding to the user input that is input to the second inputter 210.

When a sharing service or a robo-taxi service is provided, the second display 220 may display information about vehicle assignment and user information and terminal information of a user using an assigned vehicle.

When the sharing service or a robo-taxi service is provided, the second display 220 may also display location information and identification information of vehicle.

When control mark information is received through a terminal, the second processor 230 may transmit layout information of a control button corresponding to the received control mark information to the terminal.

When providing the sharing service, the second processor 230 may assign shared vehicles based on current location information, destination information, usage and/or time information of the user received through the user's terminal 300. Also, the second processor 230 may transmit, to an assigned shared vehicle, user information, terminal information, and usage information of the sharing service and may transmit identification information of the assigned shared vehicle and authentication information to use the assigned shared vehicle to the user's terminal 300.

When providing the robo-taxi service, the second processor 230 may assign robo-taxi vehicles based on current location information and destination information of the user received through the user's terminal 300. Also, the second processor 230 may transmit, to an assigned robo-taxi vehicle, the current location information, the destination information, user information, and terminal information of the user. The second processor 230 may transmit identification information of the assigned robo-taxi vehicle and authentication information to use the assigned robo-taxi vehicle to the user's terminal 300.

When providing the sharing service, the second processor 230 may transmit vehicle control right information to the vehicle 100 and may also transmit the vehicle control right information to the user's terminal 300.

When providing the robo-taxi service, the second processor 230 may transmit control right information controllable by the user to the user's terminal 300.

The second processor 230 may transmit cost information about a cost of using the sharing service and the robo-taxi service to the user's terminal 300.

The second processor 230 may be implemented as a memory (not shown) that stores an algorithm for controlling operations of constituent components of the server or data about a program that reproduces the algorithm. The second processor 230 may be implemented as a processor (not shown) that performs the above-described operations using the data stored in the memory. In this instance, the memory and the processor may be provided as one chip or provided as separate chips.

The second memory 231 may store identification information of a plurality of electronic devices corresponding to a vehicle type and vehicle model and may store layout information of a control button corresponding to each of the plurality of electronic devices.

The second memory 231 may store user information, terminal information and vehicle information.

When providing the sharing service or the robo-taxi service, the second memory 231 may store location information and identification information of vehicle.

The second memory 231 may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a hard disk drive (HDD), or a compact disc read only memory (CD-ROM), without being limited thereto.

The second memory 231 and the second processor 230 may be integrated into one chip or provided in physically separated locations.

The second communication device 240 may communicate with the vehicle 100 and the terminal 300.

The second communication device 240 may include at least one constituent component enabling communication with electronic devices located inside the server, for example, at least one of a short-range communication module, wireless communication module, or a wired communication module. A description thereof has been omitted because the description thereof is the same as that of the first communication device 136.

At least one constituent component may be added or omitted corresponding to the performance of the constituent components of the server illustrated in FIG. 6. Also, it should be understood by those having ordinary skill in the art that mutual positions of the constituent components may be modified corresponding to the performance or structure of the constituent components.

Figure 7:
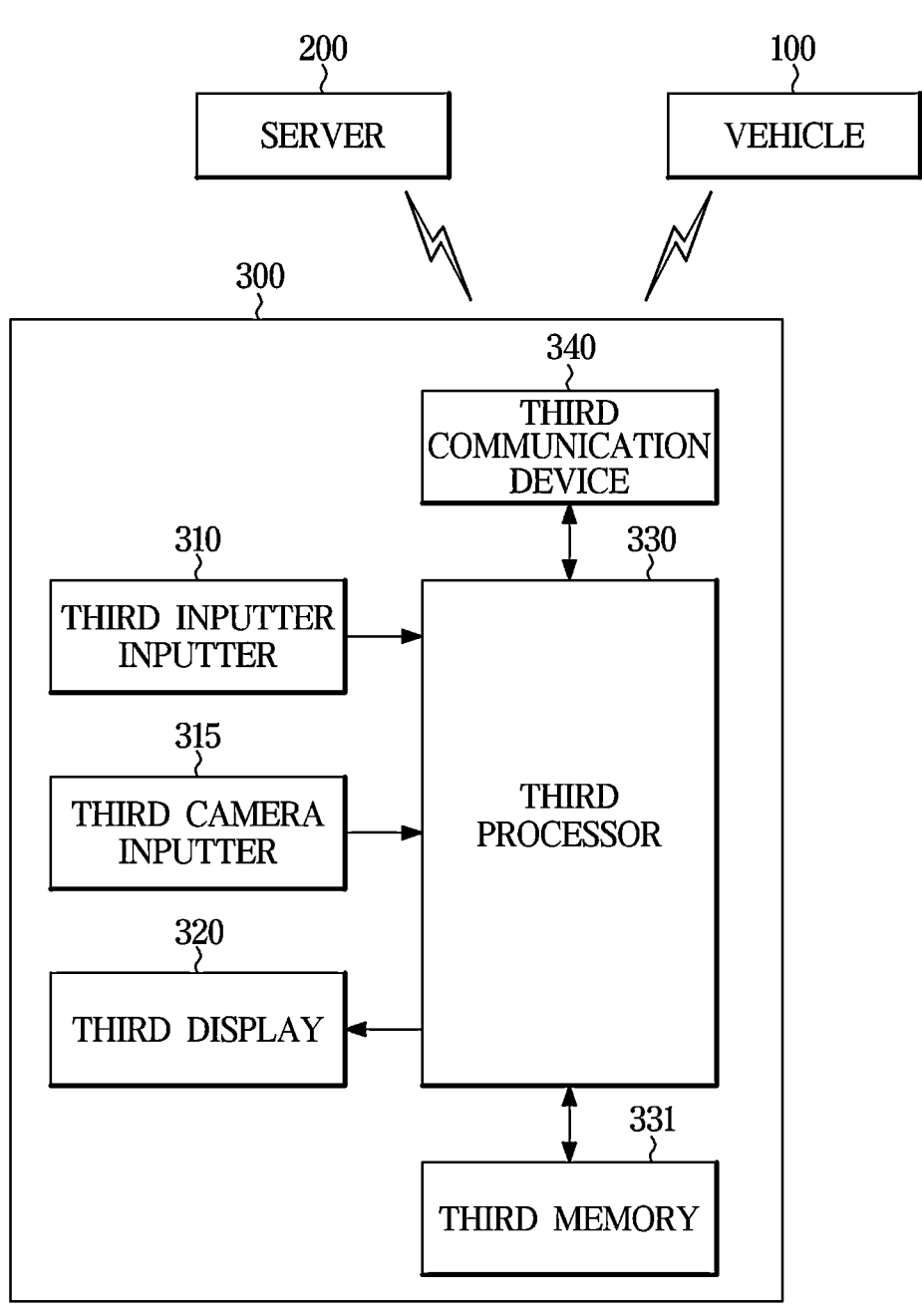
FIG. 7 is a control block diagram illustrating a terminal according to an embodiment.

FIG. 7 is a control block diagram illustrating a terminal according to an embodiment.

The terminal 300 includes a third inputter 310, a third camera 315, a third display 320, a third processor 330, a third memory 331, and a third communication device 340.

Constituent components of the terminal 300 having the same name as those of the vehicle 100 and the server 200 are referred to as "third" component to differentiate.

The third inputter 310 receives a user input.

The third inputter 310 may receive an execution command of an application and may receive a user authentication command during application execution. Also, the third inputter 310 may receive vehicle ignition on/off commands, vehicle door locking and unlocking commands, tailgate locking and unlocking commands, and the like.

The third inputter 310 may receive control information of at least one electronic device provided in the vehicle 100 during application execution. Here, the control information of the at least one electronic device may be information of a control button selected by a user among a plurality of control buttons.

The third inputter 310 may receive a user registration command for user registration and may receive a user deletion command for deleting a portion of registered users.

The third inputter 310 may receive a vehicle registration command for vehicle registration and may receive a deletion command for deleting information of registered vehicle.

The third inputter 310 may receive destination information in a navigation mode or an autonomous driving mode and may receive route information of a route selected by the user from among searched routes.

When using a sharing service, the third inputter 310 may receive a download command of an application for the sharing service and may receive an execution command of the downloaded application.

When using the sharing service, the third inputter 310 may receive current location information, destination information, and usage time information of the user and may also receive a headcount.

When using a robo-taxi service, the third inputter 310 may receive a download command of an application for the robo-taxi service and may receive an execution command of the downloaded application.

When using the robo-taxi service, the third inputter 310 may receive current location information and destination information of the user and may also receive a headcount.

When using the sharing service or the robo-taxi service, the third inputter 310 may control transmission of user authentication information.

The third inputter 310 may receive an execution command of at least one of a virtual reality (VR) mode or an augmented reality (AR) mode.

In the AR mode, virtual information (e.g., text, image, etc.) and a real object (e.g. real environment) are synthesized and output.

The AR mode may provide a user with additional information, which may not be easily obtained by only a real environment by providing a virtual relevant object on the real environment.

In the VR mode, a specific environment or situation is output as a virtual space image.

In order to share a vehicle control authority with another terminal, the third inputter 310 may receive a share command for sharing the vehicle control authority.

When the vehicle control authority is received from another terminal, the third inputter 310 may receive an authentication code for sharing the vehicle control authority in response to a request for input of the authentication code.

The third inputter 310 may receive an information transmission command about a user's emotion state.

The third inputter 310 may receive location change commands of a plurality of control buttons displayed on the third display and may receive changed location information of at least one control button from among the plurality of control buttons.

The third inputter 310 may receive an update command of the plurality of control buttons.

The third inputter 310 may receive a download command of a control button required to be added.

The third inputter 310 may receive login information for execution of at least one application. The login information may include identifier (ID) information and password information of a user.

The third inputter 310 may be implemented as a jog dial or a touchpad for inputting a movement command of a cursor displayed on the third display, a selection command of an icon or button displayed on the third display, and the like.

The third inputter 310 may include a hardware device such as various buttons or switches, a pedal, a keyboard, a mouse, a track-ball, various levers, a handle, a stick, and the like.

The third inputter 310 may also include a graphical user interface (GUI), such as a touchpad, i.e., a software device. The touch panel may be implemented as a touch screen panel (TSP) and form a mutual layer structure with the third display 320.

The third camera 315 may obtain an image around the terminal.

The third camera 315 may include at least one camera.

The third camera 315 may include a plurality of lenses or image sensors. The image sensors may include a plurality of photodiodes converting light into an electrical signal, and the plurality of photodiodes may be arranged in a 2D matrix.

The third camera 315 may include a charge-coupled device (CCD) or complimentary metal-oxide-semiconductor (CONTROL MARKOS) image sensor and may include a 3D space recognition sensor such as a KINECT (RGB-D sensor), Time of Flight (TOF), stereo camera, etc.

The third camera 315 may be a wide angle camera.

The third camera 315 may obtain an image of any one of a plurality of control marks provided in the vehicle and may transmit the image of the obtained control mark to the third processor 330.

Here, the image of the obtained control mark may be an image of a barcode mark or a QR code mark.

The third display 320 may display execution information of an application for controlling electronic devices of the vehicle owned by the user, execution information of an application for providing a sharing service, and execution information of an application for providing a robo-taxi service.

When using a sharing service, the third display 320 may display information about a shared vehicle assigned to the user.

When using a robo-taxi service, the third display 320 may display information about a robo-taxi vehicle assigned to the user.

When pairing with the vehicle, the third display 320 may display paring success information or pairing failure information and may also display user authentication success information or user authentication failure information.

The third display 320 may display, as an image, a control button for controlling at least one electronic device provided in the vehicle in response to a control command of the third processor 330.

The third display 320 may display an image of a control mark obtained by the third camera 315.

The third display 320 may display, as an image, operation information about at least one function performed in the terminal 300 in response to a control command of the third processor 330 and may display information corresponding to a user input received to the third inputter 310.

The third display 320 may be provided as a cathode ray tube (CRT), a digital light processing (DLP) panel, a plasma display panel (PDP), liquid crystal display (LCD) panel, electro luminescence (EL) panel, electrophoretic display (EPD) panel, electrochromic display (ECD) panel, light emitting diode (LED) panel, organic LED (OLED) panel, and the like, without being limited thereto.

The third inputter 310 and the third display 320 may be implemented as a touch screen in which a touch panel and a display panel are integrated.

When a control mark is a QR code mark, the third processor 330 recognizes information from an image of the control mark obtained by the third camera 315, obtains identification information of an electronic device based on the recognized information, and controls the third display 320 to display a plurality of control buttons corresponding to the obtained identification information of the electronic device.

When a control mark is an NFC mark, the third processor 330 controls NFC communication in response to a contact between the terminal and the NFC mark of the vehicle, recognizes information obtained through NFC communication, obtains identification information of an electronic device based on the recognized information, and controls the third display 320 to display a plurality of control buttons corresponding to the obtained identification information of the electronic device.

The third processor 330 confirms a control button selected through the third inputter from a plurality of control buttons displayed on the third display 320 and transmits control information of an electronic device corresponding to the confirmed control button to the vehicle 100.

Each of the plurality of control buttons may match with each of the plurality of electronic devices provided in the vehicle and may include identification information of a matched electronic device.

Control information of an electronic device corresponding to a control button is a user input and includes control information for controlling at least one function performed in an electronic device matching with any one control mark.

For example, the plurality of control buttons may include: an on/off button and a sound level button of at least one speaker; an on/off button and a target temperature setting button of at least one seat heater; an on/off button and an air volume setting button of at least one seat ventilation; an on/off button of a steering wheel heater; an on/off button and a content selection button of the first display; a forward/backward distance setting button, a height setting button, and a backrest angle setting button of at least one seat adjustment member; an on/off button, a color setting button, and a brightness setting button of a lighting device; and/or a cooling on/off button, a heating on/off button, an air volume setting button, a wind direction setting button, and a target temperature setting button of an air conditioner provided in the vehicle.

When a pairing request signal is received from the vehicle, the third processor 330 may transmit pairing information for vehicle pairing to the vehicle.

In other words, when pairing with the vehicle, the third processor 330 may transmit an authentication code input to the third inputter 310 to the vehicle 100. In this instance, the vehicle 100 compares the received authentication code and a stored authentication code, and when it is determined that the received authentication code is identical to the stored authentication code, the vehicle 100 determines that pairing is successful.

Here, the authentication code is generated and stored in the vehicle when a pairing command is input to the vehicle and is displayed on the first display.

The third processor 330 may confirm information being output from the terminal in response to pairing with the vehicle 100 and may transmit, to the vehicle, the confirmed information being output.

The third processor 330 may monitor a state of the user based on face information of the user obtained by the third camera, voice information of the user received by a microphone (not shown), and text information received in the third inputter and may transmit information about the monitored user's state to the vehicle 100.

When a control mark is an NFC mark provided around a Bluetooth communication symbol, the third processor 330 may control Bluetooth communication in response to a contact between the terminal 300 and the NFC mark of the vehicle and may perform pairing with the vehicle 100 based on information obtained through NFC communication.

The third processor 330 may perform user authentication based on ID information and password information of a user, which is input through the third inputter 310 during application execution. When user authentication is completed, the third processor 330 may transmit authentication information about the user authentication to the vehicle 100.

When the terminal is a terminal of a user who owns the vehicle, the third processor 330 may also transmit a vehicle control authority to another terminal in response to a sharing command received in the third inputter 310. Here, the other terminal may be an auxiliary terminal of the user who owns the vehicle or a terminal of another user other than the user owning the vehicle.

When the terminal is not a terminal of a user who owns the vehicle, based on receiving input request information of an authentication code from the terminal of the user, the third processor 330 may control the third display 320 to display the received input request information of the authentication code. Also, when the authentication code is received from the third inputter 310, the third processor 330 may transmit the received authentication code to the user's terminal. When a vehicle control authority is received from the user's terminal, the third processor 330 may store the received vehicle control authority.

When the terminal is not a terminal of a user who owns the vehicle, the third processor 330 may receive a vehicle control authority from the user's terminal during application execution.

When using a sharing service, the third processor 330 transmits, to the server 200, current location information, destination information, and usage time information of the terminal received through the third inputter 310 during application execution. The third processor 330 may control the third display 320 to display vehicle information and cost information received from the server 200.

When the terminal is not a terminal using a sharing service, the third processor 330 may receive a vehicle control authority from a terminal using the sharing service during application execution. In this case, the third processor 330 may transmit a user input received through the third inputter 310 to the vehicle 100.

When using a robo-taxi service, the third processor 330 transmits, to the server 200, current location information and destination information of the terminal received through the third inputter 310. The third processor 330 may control the third display 320 to display vehicle information and cost information received from the server 200.

When the terminal is not a terminal using a robo-taxi service, the third processor 330 may receive a vehicle control authority from a terminal using the robo-taxi service during application execution. In this case, the third processor 330 may transmit a user input received through the third inputter 310 to the vehicle 100.

When an electronic device is added to the vehicle, the third processor 330 may store information about a control button for controlling the added electronic device. When an electronic device provided in the vehicle is removed, the third processor 330 may delete information about a control button for controlling the removed electronic device. In other words, the third processor 330 may update information about a control button and may control display of an updated control button.

When a location change command is received through the third inputter in a state where a plurality of control buttons is displayed on the third display, the third processor 330 may perform a location change mode. In the location change mode, the third processor 330 may receive a control button selected through the third inputter 310 and the change location information of the selected control button and may change a location of the selected control button to be displayed based on the received change location information.

When a location change completion command is received through the third inputter 310, the third processor 330 may control display of a plurality of control buttons whose locations have been changed.

The third processor 330 may transmit location change information of the plurality of control buttons to the server 200. In this case, a user of the terminal may receive a service fee from users downloading arrangement information of the plurality of control buttons whose locations have been changed from the server 200.

When a VR mode is selected through the third inputter 310, the third processor 330 may control display of a plurality of control buttons as a VR image.

When an execution command of an AR application is received through the third inputter 310, the third processor 330 may control display of an execution image of an AR mode. In this case, the third processor 330 may control display of a plurality of control buttons as an AR image.

The third processor 330 may perform image processing on an image obtained by the third camera and may control display of a plurality of control buttons together with the image-processed image.

When user authentication is completed, the third processor 330 may receive an electronic key of the vehicle from the server 200.

The third processor 330 may be implemented as a memory (not shown) that stores an algorithm for controlling operations of constituent components of the terminal 300 or data about a program that reproduces the algorithm. The third processor 330 may be implemented as a processor (not shown) that performs the above-described operations using the data stored in the memory. In this instance, the memory and the processor may be provided as one chip or provided as separate chips.

The third memory 331 may store identification information of the terminal, user information, and vehicle information.

The third memory 331 stores identification information of the terminal, user information, and vehicle information.

The third memory 331 stores applications for a sharing service and a robo-taxi service.

The third memory 331 may also store identification information of a paired vehicle.

When information of an electronic key is received from the server 200, the third memory 331 may store the information of the received electronic key.

The third memory 331 may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a hard disk drive (HDD), or a compact disc read only memory (CD-ROM), without being limited thereto.

The third memory 331 and the third processor 330 may be integrated into one chip or provided in physically separated locations.

The third communication device 340 may communicate with the vehicle 100 and the server 200.

The third communication device 340 may include at least one constituent component enabling communication with electronic devices located inside the terminal 300, for example, at least one of a short-range communication module, wireless communication module, or a wired communication module. A description thereof has been omitted because the description thereof is the same as that of the first communication device 136.

The third communication device 340 may include an NFC communication module performing NFC communication and may transmit information received from the NFC communication module of the vehicle to the third processor 330.

At least one constituent component may be added or omitted corresponding to the performance of the constituent components of the terminal illustrated in FIG. 7. Also, it should be easily understood by those having ordinary skill in the art that mutual positions of the constituent components may be modified corresponding to the performance or structure of the constituent components.

The terminal 300 may obtain information of one of a plurality of control marks provided in the vehicle 100, may recognize an electronic device about the obtained control mark, and may display a plurality of control buttons for controlling the recognized electronic device.

The terminal 300 may transmit, to the vehicle, information about a control button selected through the third inputter from the plurality of control buttons displayed on the third display.

When the information about the control button selected through the third inputter is received from the terminal 300, the vehicle 100 may control an operation of the recognized electronic device based on the received information.

As such, a vehicle control system may provide a user-customized user interface and a user interface capable of interacting with a user.

The above is described below with reference to FIGS. 8-17B.

Figure 8:
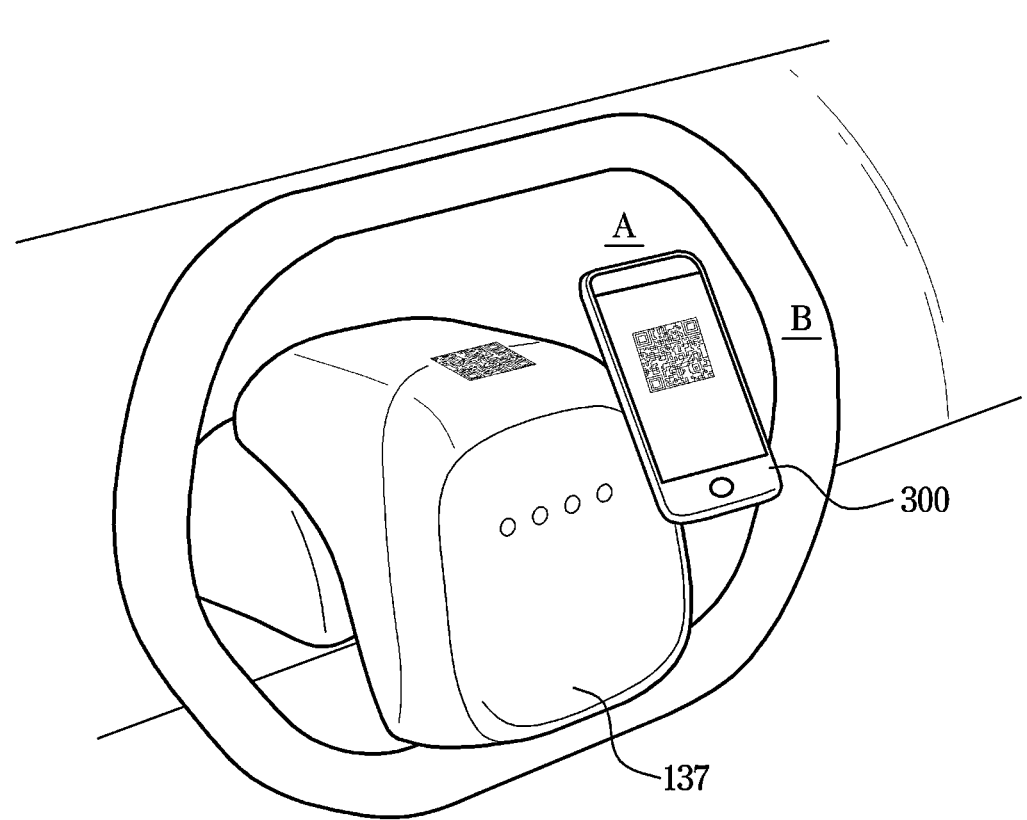
FIG. 8 is a diagram illustrating an example of a terminal obtaining a control mark according to an embodiment.

As shown in FIG. 8, when a control mark is provided on an upper side of a spider 137 of a steering wheel of a vehicle, after an execution of an application of a terminal and user authentication, the terminal obtains an image of the control mark on the upper side of the spider of the steering wheel using the third camera of the terminal.

When a control mark is a QR code mark, the terminal may obtain QR code information and may transmit an ignition ON command to the vehicle based on the obtained QR code information.

In this instance, the vehicle may start the vehicle in response to the ignition ON command transmitted from the terminal.

The terminal may be detachably mounted on an area A of the dashboard 122 or an area B of the steering wheel.

Figure 9A:
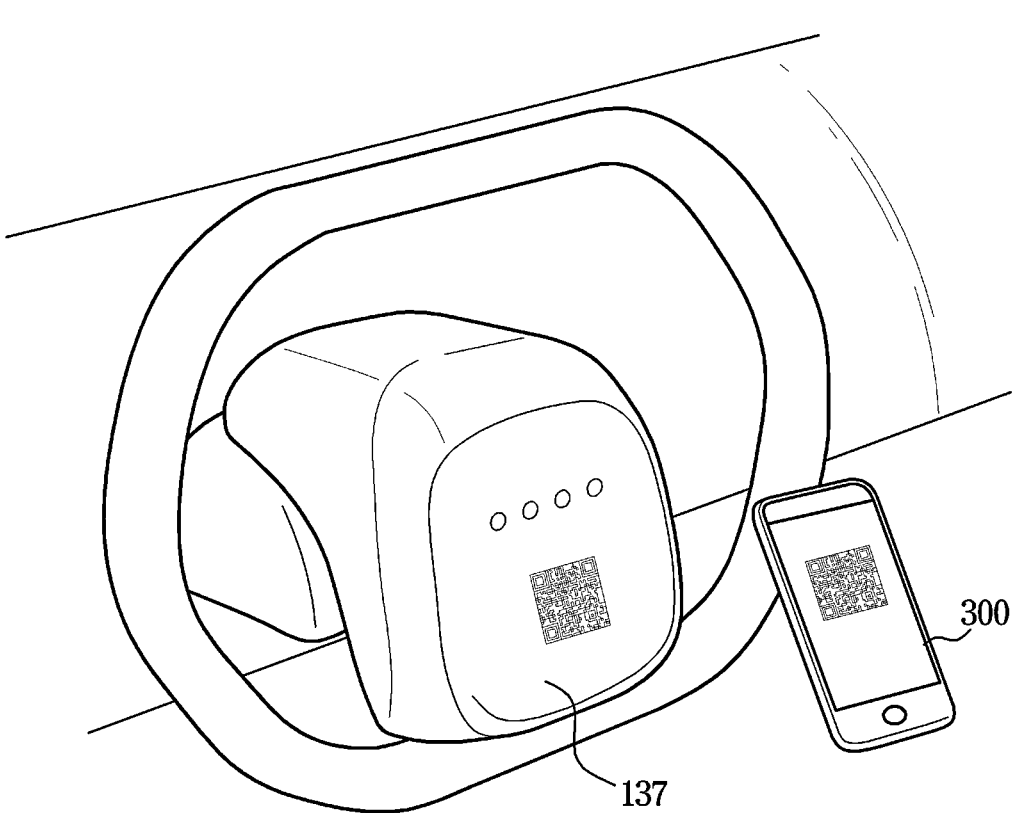

As shown in FIG. 9A, when a control mark is provided on a front side of the spider 137 of the steering wheel of the vehicle, after an execution of an application of the terminal 300, the terminal obtains an image of the control mark on the front side of the spider of the steering wheel using the third camera 315 of the terminal.

Figure 9B:
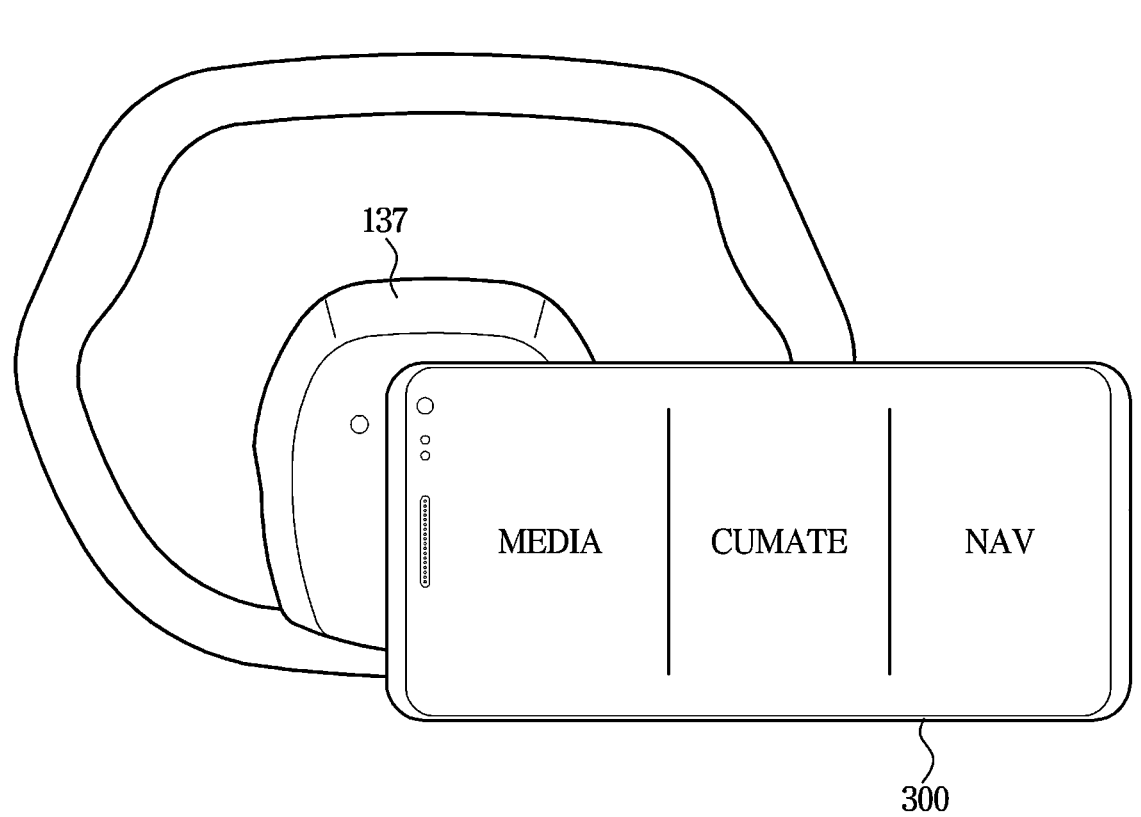

As shown in FIG. 9B, when a control mark is a QR code mark, the terminal 300 may obtain QR code information and display control buttons for setting basic functions performed in the vehicle based on the obtained QR code information.

For example, the basic functions may include a media function, an air conditioning function, and a navigation function. The control buttons for the media function, the air conditioning function, and the navigation function may be an upper control button.

Figure 9C:
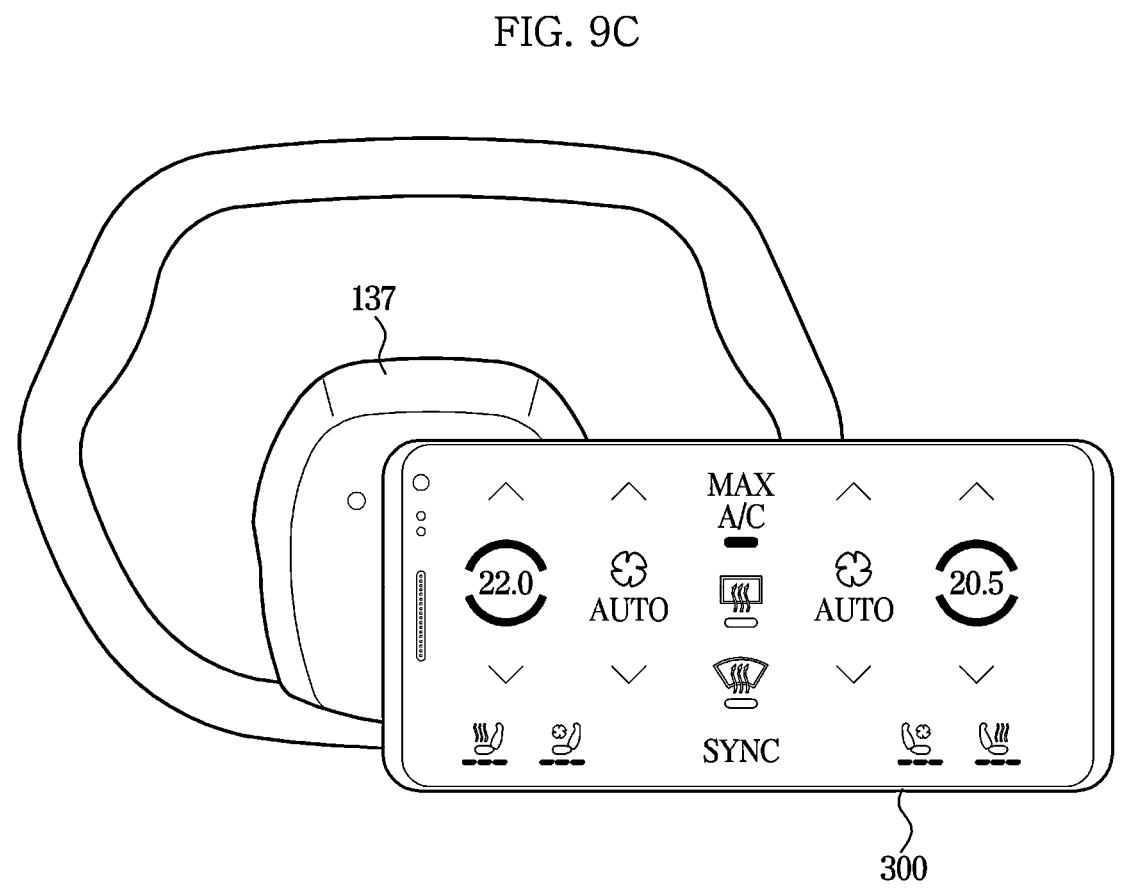

As shown in FIG. 9C, when any one is selected from a plurality of control buttons through the third inputter, the terminal may display lower control buttons corresponding to the selected control button.

For example, when a user input received through the third inputter is a selection of a control button for setting an air conditioning function, the terminal may display a plurality of control buttons related to the selected air conditioning function.

Here, the plurality of control buttons related to the air conditioning function may include a target temperature button and a target air volume button for each seat, a cooling target temperature button, a wind direction button for each seat, a defrost button for front windshield glass, and a defrost button for rear windshield glass.

Figure 10A:
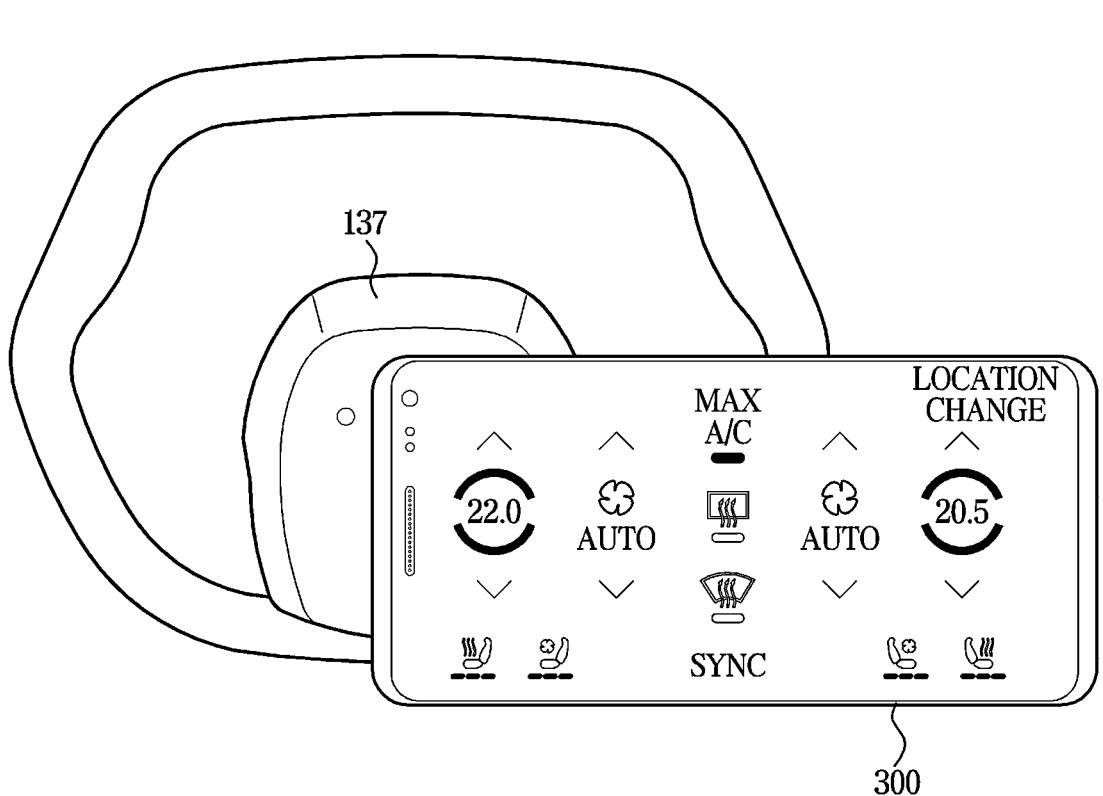
FIGS. 10A and 10B are diagrams illustrating examples of location change of control buttons displayed on a terminal according to an embodiment.

As shown in FIG. 10A, when a location change command is received through the third inputter in a state where a plurality of control buttons is displayed, the terminal performs a location change mode.

Figure 10B:
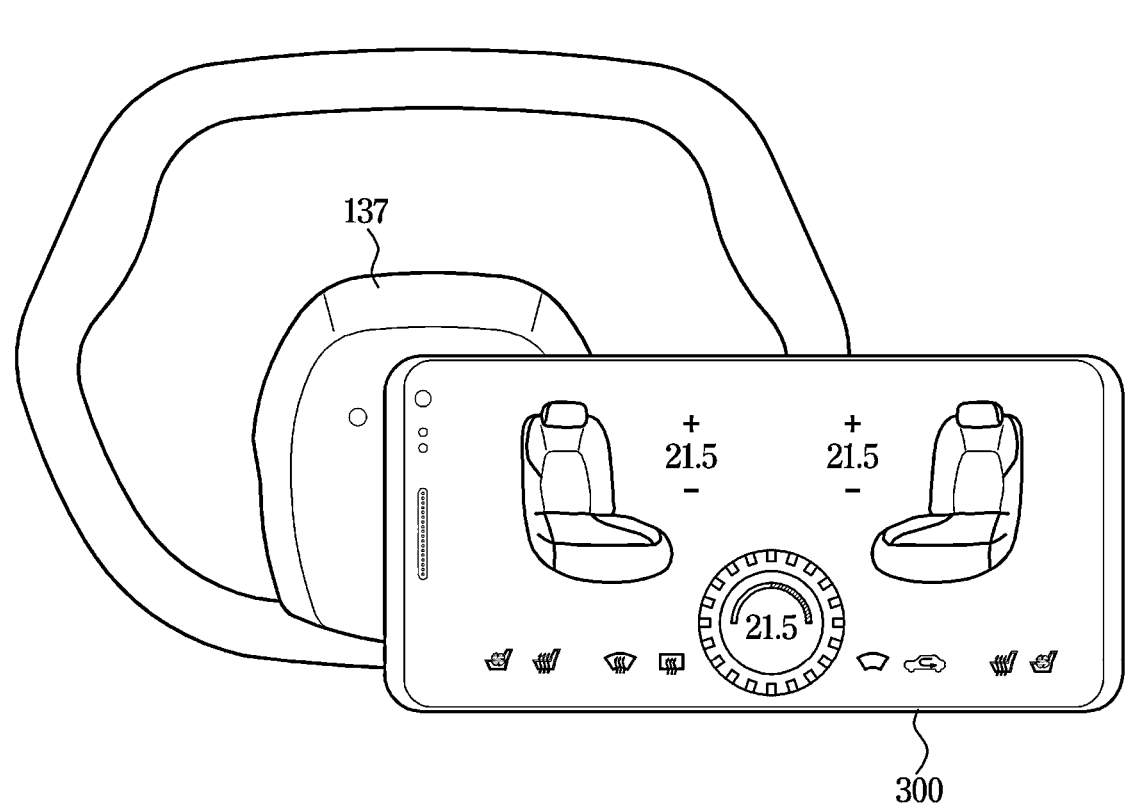

As shown in FIG. 10B, the terminal may change locations of the plurality of control buttons based on a user input received through the third inputter during the location change mode.

Also, when an icon change command is received through the third inputter 310 in a state where a plurality of control buttons is displayed, the terminal may perform an icon change mode, may display an icon changeable for each control button during the icon change mode, and may change icons of the plurality of control buttons based on a user input received through the third inputter.

Figure 11A:
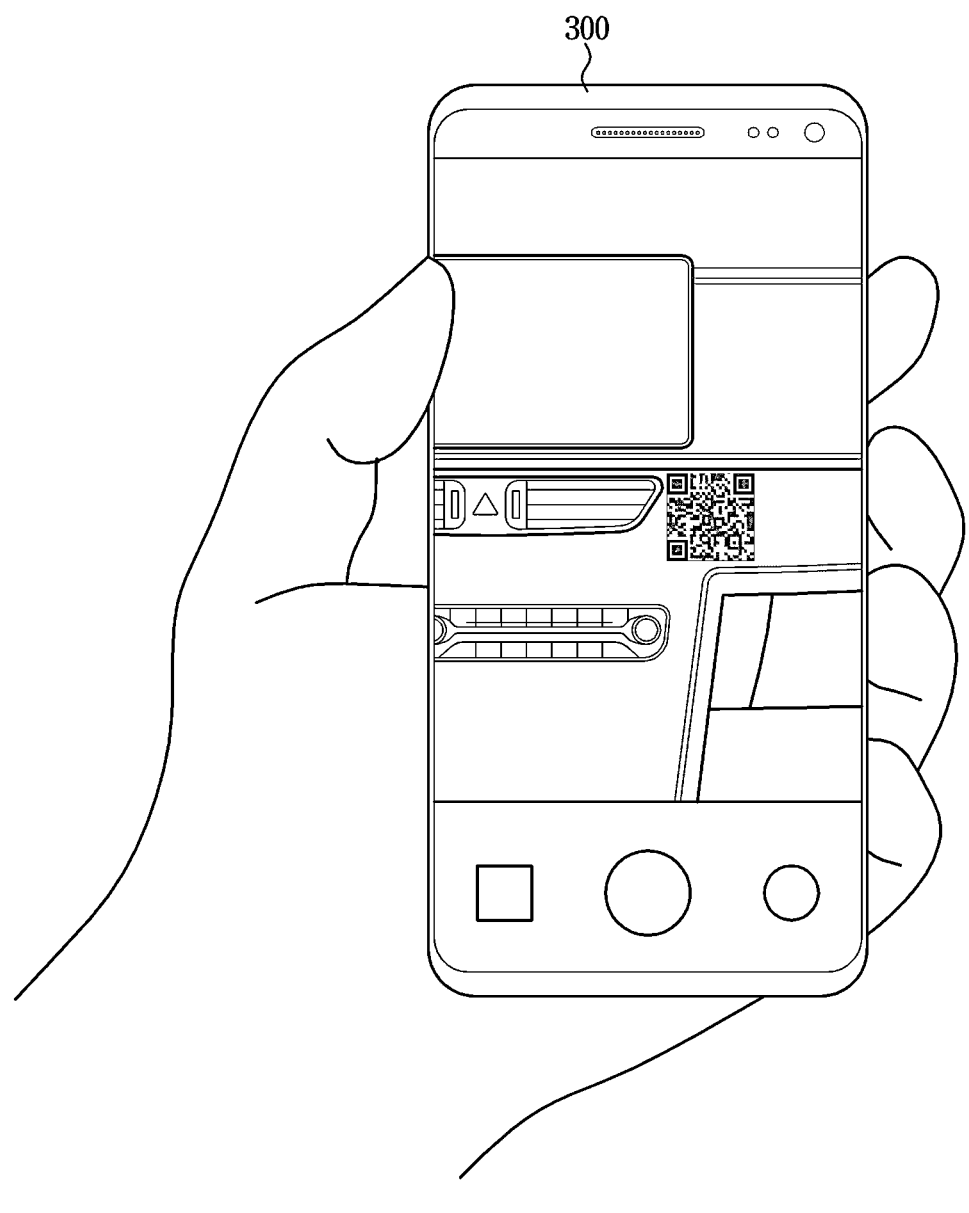
FIGS. 11A and 11B are diagrams illustrating examples of control buttons displayed after obtaining a control mark of an air conditioner through a terminal according to an embodiment.

As shown in FIG. 11A, the terminal executes an application and obtains an image of a control mark provided around an air vent of an air conditioner using the third camera of the terminal.

Figure 11B:
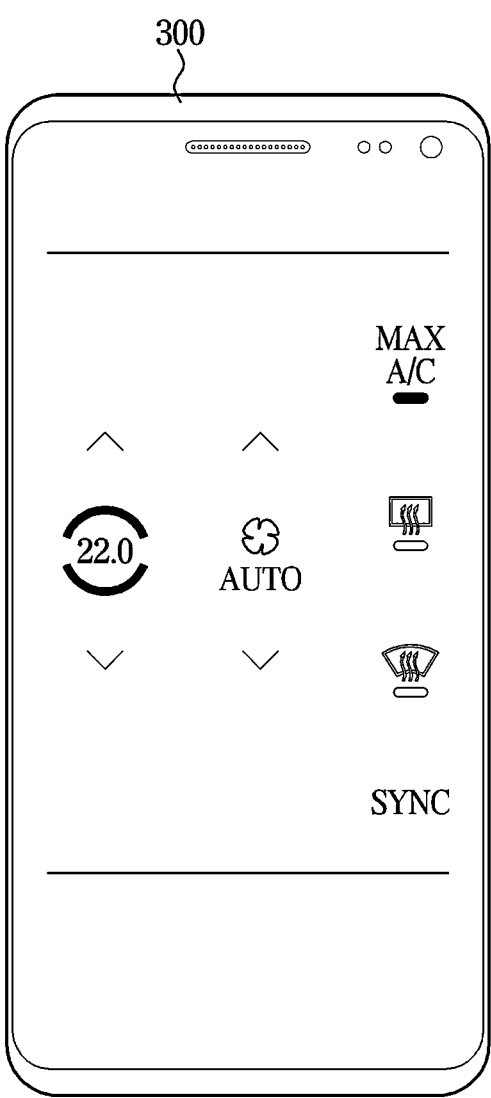

As shown in FIG. 11B, when a control mark is a QR code mark, the terminal obtains QR code information and displays control buttons for operating an air conditioning function based on the obtained QR code information.

When the control mark obtained by the third camera of the terminal is a control mark provided around an air vent of an air conditioner of a driver's seat side, the terminal may display only control buttons for operating an air conditioning function of the driver's seat side.

Figure 12A:
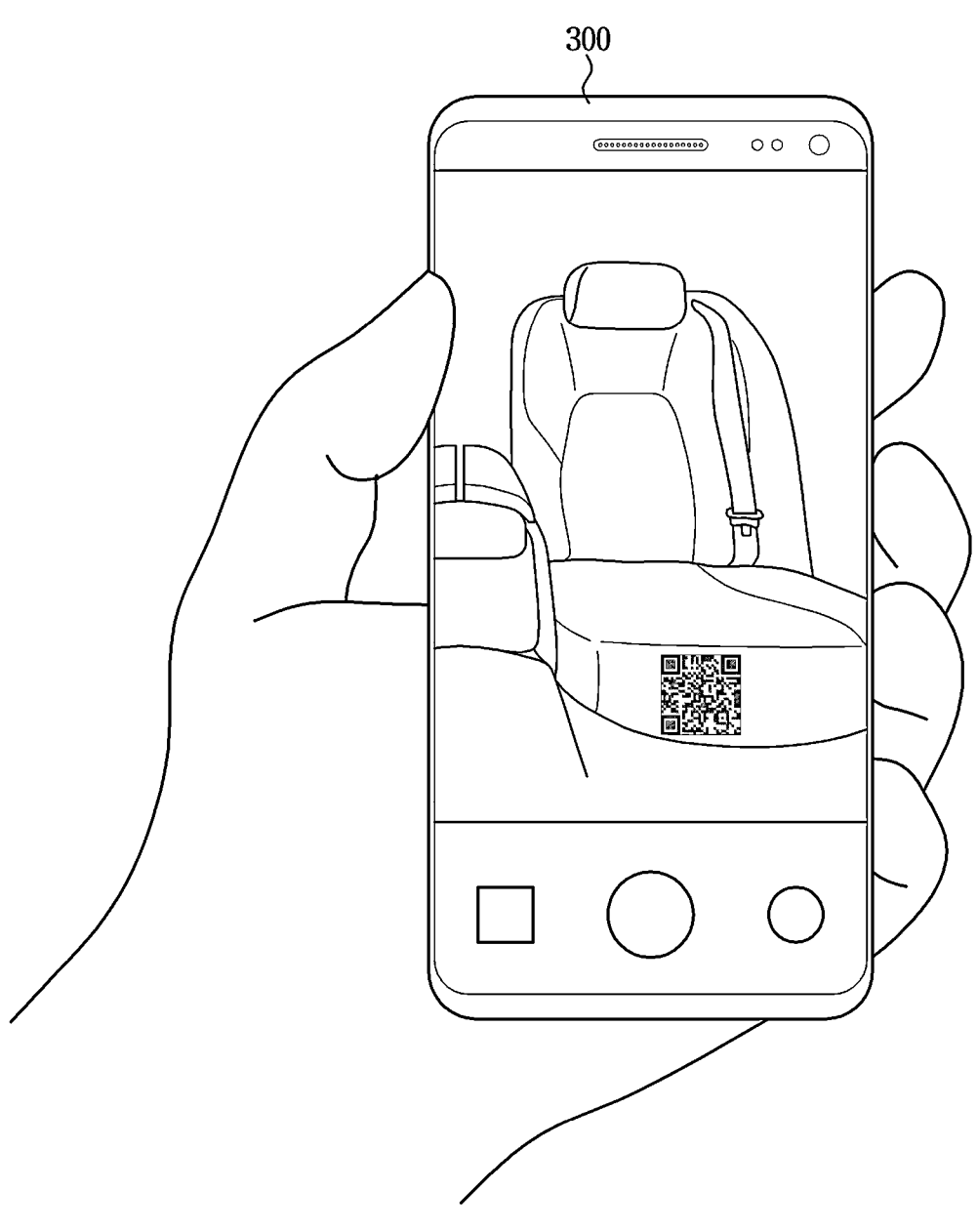
FIGS. 12A and 12B are diagrams illustrating examples of control buttons displayed after obtaining a control mark of a seat through a terminal according to an embodiment.

When a seat heater and a seat ventilation are added in a state where the seat heater and seat ventilation have not been provided in the vehicle, as shown in FIG. 12A, the terminal obtains an image of a control mark provided on a seat using the third camera of the terminal during application execution.

Figure 12B:
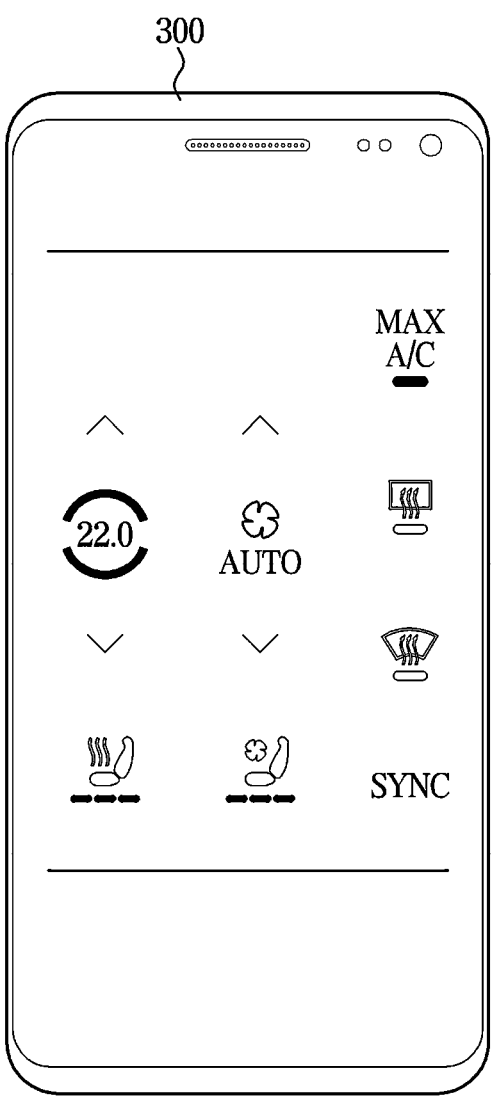

As shown in FIG. 12B, when a control mark is a QR code mark, the terminal obtains QR code information and additionally displays control buttons for operating a seat heating function and a seat ventilation function based on the obtained QR code information.

When the control mark obtained by the third camera of the terminal is a control mark provided on a driver's seat, the terminal may add and display control buttons for operating the seat heating function and the seat ventilation function of the driver's seat side.

The control buttons for the air conditioning function may include cooling/heating target temperature buttons, a wind direction button, and an air volume button as a basic control button and may include a target temperature button of seat heater and a target air volume button of seat ventilation as additional control buttons.

The above-described control buttons for the air conditioning function may be transmitted to another terminal, thereby allowing the other terminal to control the air conditioning function of the vehicle.

When using a robo-taxi service, a user executes an application of the terminal and inputs destination information. The terminal receives the destination information during application execution, confirms current location information of the terminal, and transmits the destination information and the current location information of the terminal to the server. The server may assign a robo-taxi vehicle based on the destination information and the current location information of the terminal, may transmit the destination information and the current location information of the terminal to an assigned robo-taxi vehicle, may transmit information about the robo-taxi vehicle to the user's terminal, and may transmit information about a time that the robo-taxi vehicle may arrive at the current location of the terminal.

Figure 13A:
FIGS. 13A, 13B, and 13C are diagrams illustrating examples of acquisition of control mark and display of control buttons after calling a robo-taxi through a terminal according to an embodiment.

As shown in FIG. 13A, when vehicle information and arrival time information are received from the server 200, the terminal 300 may display information about success of robo-taxi call, the vehicle information and the arrival time information.

The terminal may obtain distance information between the terminal and the vehicle based on current location information of the terminal and current location information of the vehicle and may display arrival information of the vehicle based on the obtained distance information.

Figure 13B:
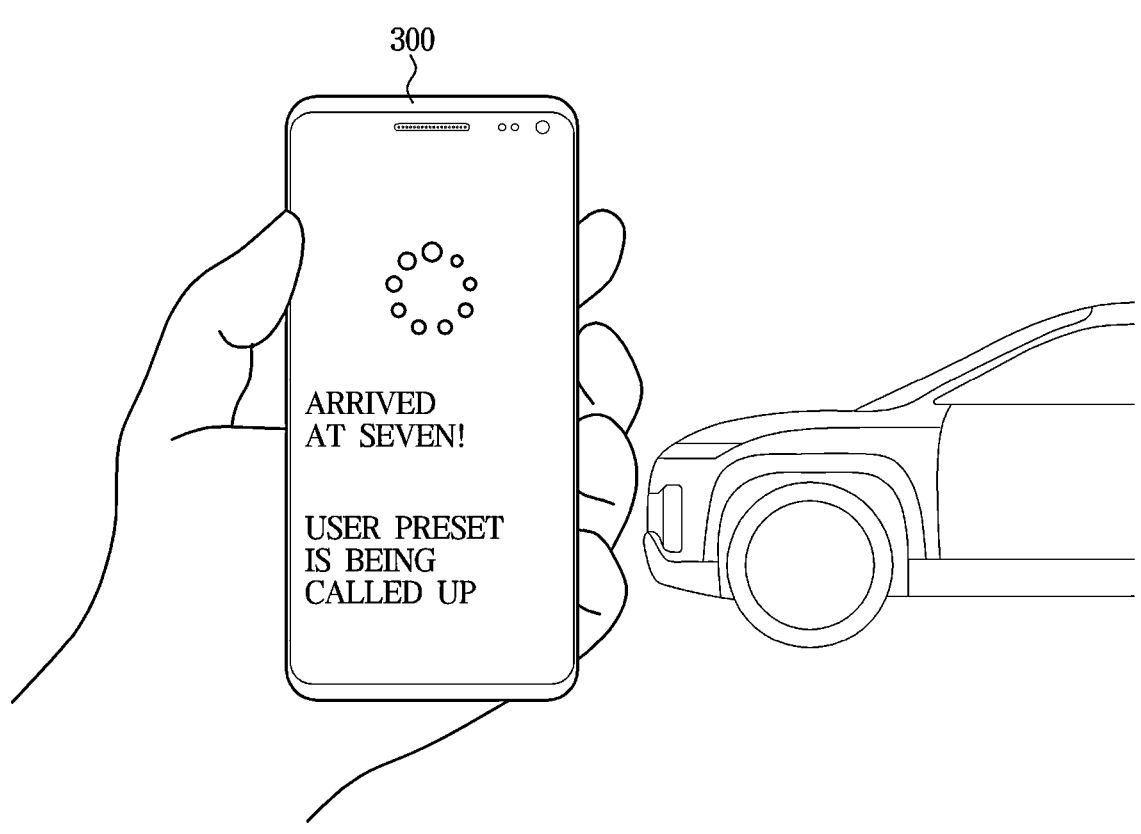

As shown in FIG. 13B, when a user gets in the robo-taxi vehicle, the terminal may collect control information of electronic devices of robo-taxi vehicles that have been controlled by the user when the user has used robo-taxi vehicles in the past.

Figure 13C:
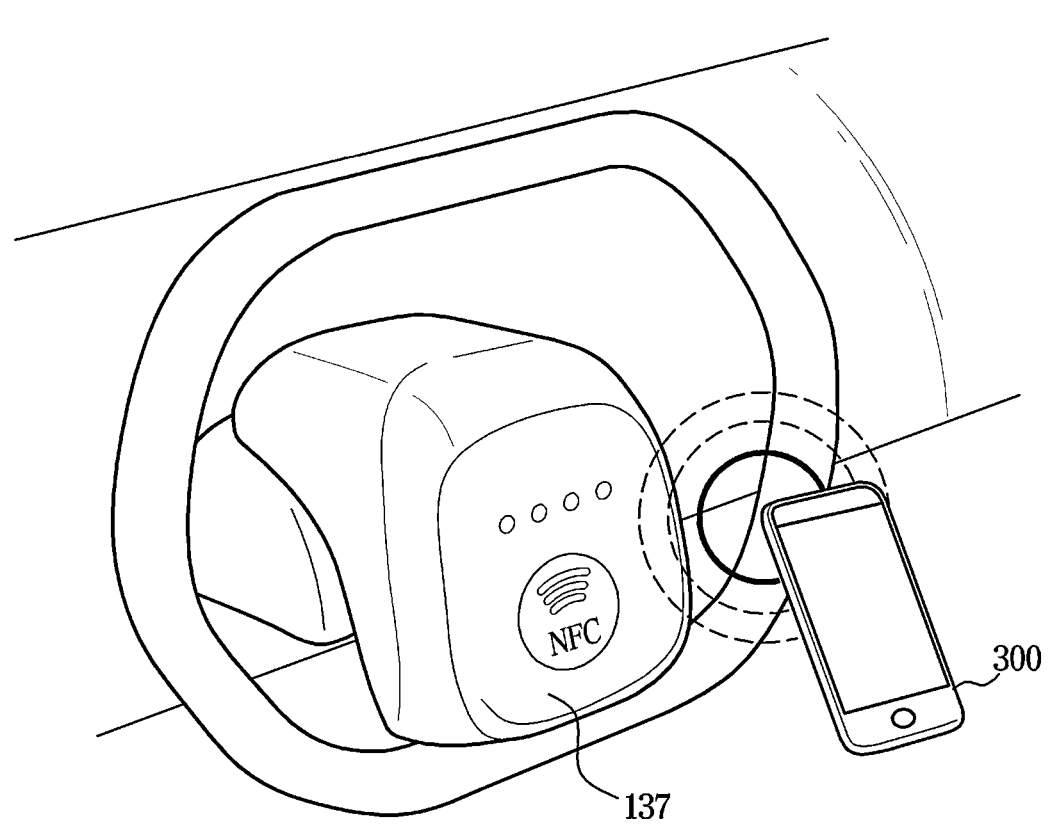

As shown in FIG. 13C, after getting in the robo-taxi vehicle, the user may make contact with a control mark on a steering wheel of the robo-taxi vehicle.

When the control mark on the steering wheel is an NFC mark, the terminal may perform NFC communication with the vehicle and may perform pairing with the vehicle through NFC communication.

When pairing with the robo-taxi vehicle is completed, the terminal may transmit information being output from the terminal to the vehicle. For example, when music is playing through the terminal, the terminal may transmit information about the music being reproduced, to the vehicle. In this instance, the vehicle may play the music received through the terminal, through a speaker.

The terminal using the robo-taxi service may transfer a control authority of the robo-taxi service to another terminal during application execution.

The terminal using the robo-taxi service may transmit, to the server, current location information and destination information of another terminal received through the third inputter and may transmit identification information of the other terminal. The server may request the other terminal for authentication code input.

Figure 14:
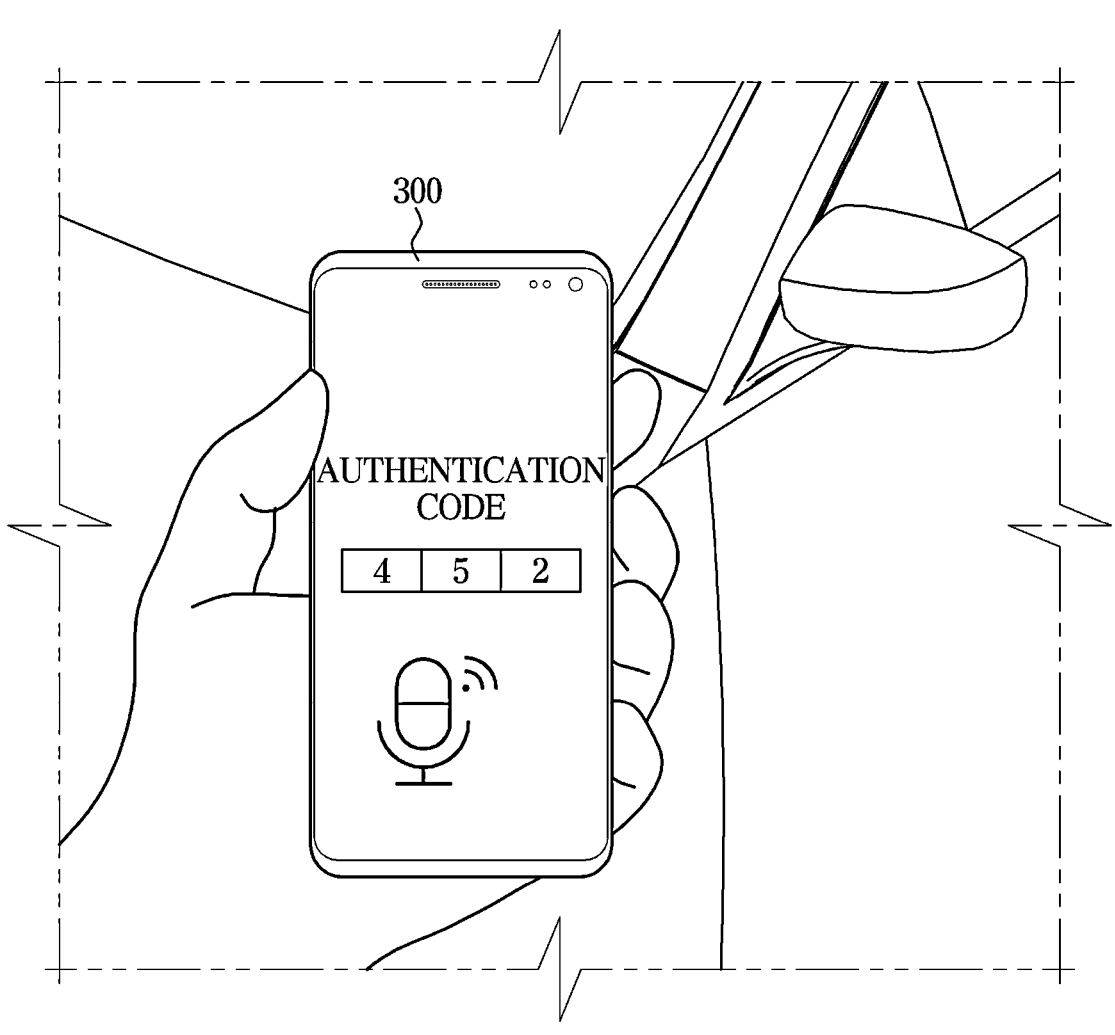
FIG. 14 is a diagram illustrating an example of displaying an authentication code of a terminal to receive a control authority of a vehicle according to an embodiment.

As shown in FIG. 14, when an authentication code input request is received, the other terminal may display information about the received authentication code input request and may compare an authentication code input by the user and a preset authentication code. When the input authentication code and the preset authentication code are identical to each other, the other terminal may determine that authentication is successful, and display authentication success information.

In this case, the other terminal may display information of a robo-taxi vehicle, and arrival time information of the robo-taxi vehicle.

The vehicle may monitor a user's state based on image information obtained by an internal camera and voice information obtained by a microphone. When it is determined that the user's state is an abnormal state based on the monitoring information, the vehicle may obtain destination information based on the user's abnormal state and may control autonomous driving based on the obtained destination information.

Figure 15:
FIG. 15 is a diagram illustrating an example of displaying state information of a user through a terminal according to an embodiment.

As shown in FIG. 15, when it is determined that the user's state is an abnormal state, the vehicle may perform pairing with the terminal, may display information about the user's state, and may transmit the information about the user's state to an external device.

The external device may include a server of a hospital, a police station, a fire station, and a pre-registered terminal.

When a cancellation command is received through the third inputter with an emergency message displayed, the terminal may cancel the change of destination and information transmission to the external device.

Figure 16:
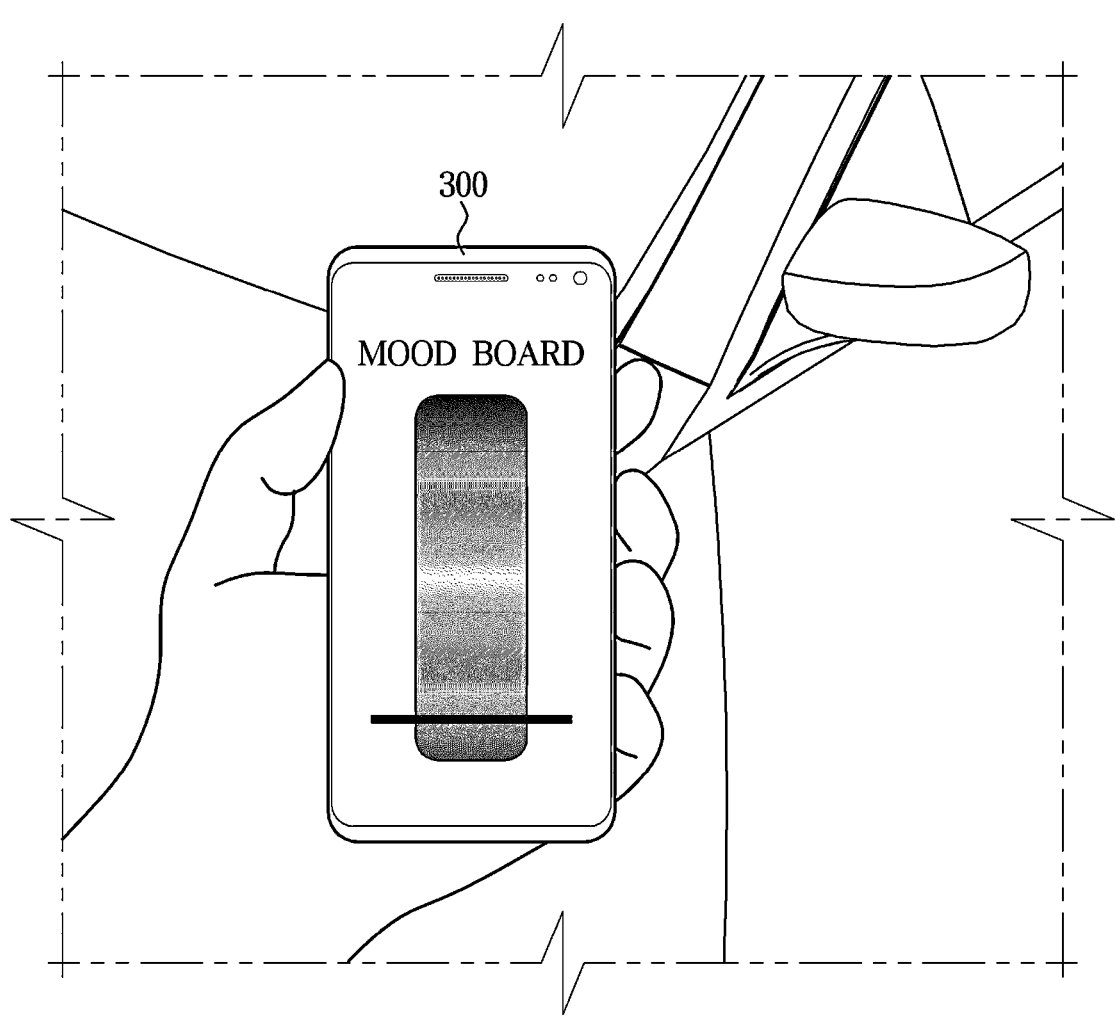
FIG. 16 is a diagram illustrating an example of receiving emotion state information of a user through a terminal according to an embodiment.

As shown in FIG. 16, the terminal may receive user's emotion state information through the third inputter. When the emotion state information is received through the third inputter, the terminal may transmit the received emotion state information, to the vehicle.

When the emotion state information is received from the terminal, the vehicle may control at least one of a brightness or color of a lighting device corresponding to the emotion state information of the user.

When the emotion state information is received from the terminal, the vehicle may also control music playback corresponding to the emotion state information of the user.

Figure 17A:
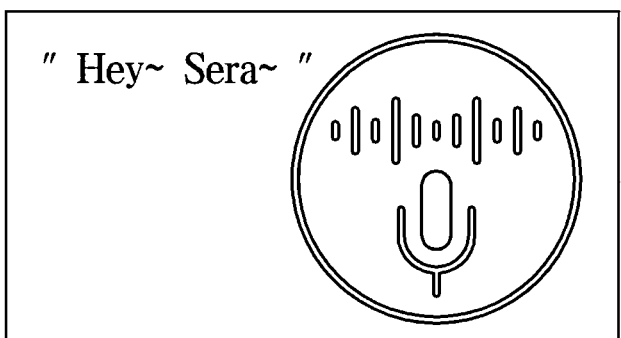
FIGS. 17A and 17B are diagrams illustrating an example of performing voice recognition through a vehicle according to an embodiment.

As shown in FIG. 17A, when it is determined that a voice received in a microphone is a trigger word, the vehicle performs a voice recognition mode.

Figure 17B:
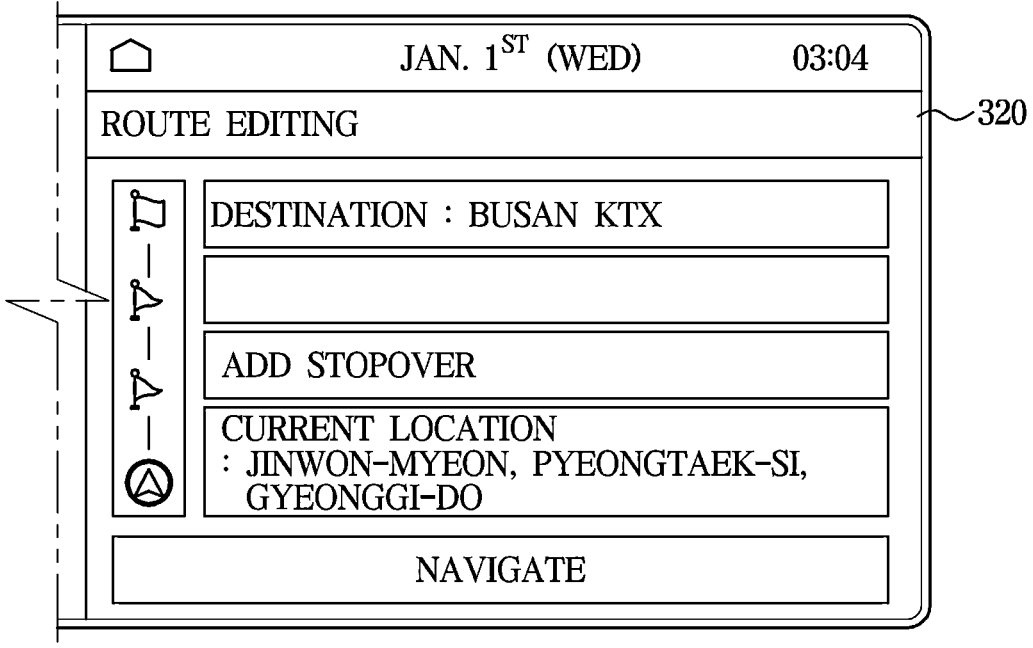

As shown in FIG. 17B, during the voice recognition mode, the vehicle may obtain a user input based on the voice received in the microphone and may control an operation of at least one electronic device based on the obtained user input.

For example, when the recognized voice is 'addition of stopover', the vehicle may search for a route connecting a current location, the stopover, and a destination and may control route guidance based on the retrieved route.

As is apparent from the above, according to the embodiments of the disclosure, when displaying control buttons for operating functions performable in a vehicle through a user terminal, control buttons desired by a user can be displayed. A user's operation convenience may thereby be improved, and the user's distraction may thereby be reduced.

According to the embodiments of the disclosure, because a plurality of physical input devices is not required to be installed on a vehicle, no physical large space is required. A physical input device, lighting for the physical input device, and the like can be minimized. Thus, a vehicle manufacturing cost can be reduced.

In other words, according to the embodiments of the disclosure, hardware switches, keys, buttons, and display devices corresponding to basic elements of a vehicle's interior can be replaced with a user terminal. Thus, a design freedom may be improved and development cost and material cost of input devices and display devices may be reduced.

According to the embodiments of the disclosure, control buttons for functions controllable in each seat of a vehicle can be displayed through a user terminal and allow each user to select a vehicle function according to personal preferences.

According to the embodiments of the disclosure, each user in a vehicle can interact with the vehicle and a personalized interface can be implemented through a terminal, and thus an interface optimized for each user can be provided and a user's usability can be improved.

In this instance, a user can experience a new joy of driving when using autonomous driving by linking the user's terminal to the vehicle.

According to the embodiments of the disclosure, a user input can be received through voice recognition and gesture recognition. Thus, malfunction scenarios or user types, such as the disabled who may not easily use a terminal can be easily and quickly accommodated.

According to the embodiments of the disclosure, control buttons displayed on a terminal can be updated in response to a change in vehicle type or vehicle function.

According to the embodiments of the disclosure, a platform enabling trade and sharing online can be built by uploading a user interface (UI) of a terminal and converting into NFT in response to a change in vehicle type or vehicle function. In this instance, a new business profit model can be established through income from separate fee.

According to the embodiments of the disclosure, quality and marketability of a vehicle can be improved, and user satisfaction, user convenience, and vehicle safety can also be improved.

Meanwhile, embodiments can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions, which may be decoded by a computer are stored of, for example, a read only memory (ROM), random access memory (RAM), magnetic tapes, magnetic disks, flash memories, optical recording medium, and the like.

Although embodiments have been described for illustrative purposes, those having ordinary skill in the art should appreciate that various modifications, additions, and substitutions are possible, without departing from the scope and spirit of the disclosure. Therefore, embodiments have not been described for limiting purposes.

What is claimed is:

1. A vehicle, comprising:
a vehicle body in which a plurality of control marks is provided;
a plurality of electronic devices provided in the vehicle body and provided to match with the plurality of control marks, respectively;
a communication device configured to communicate with a terminal; and
a processor configured to control, based on receiving a user input corresponding to one control mark of the plurality of control marks from the terminal, an operation of an electronic device matching with the one control mark in response to the received user input,
wherein each of the plurality of control marks is provided at a position corresponding to a location of a matched electronic device in the vehicle body and includes identification information for the matched electronic device.

2. The vehicle of claim 1, wherein:
each of the plurality of control marks is a quick response (QR) code mark or a near-field communication (NFC) mark; or
a portion of the plurality of control marks are QR code marks and others are NFC marks; and the communication device includes a plurality of NFC communication modules provided around each of the NFC marks and configured to perform NFC communication.

3. The vehicle of claim 1, wherein each of the plurality of control marks includes identification information of the matched electronic device, and wherein the user input includes control information for controlling at least one function performed in the electronic device matching with the one control mark.

4. The vehicle of claim 1, wherein the plurality of electronic devices includes at least two of at least one speaker, at least one seat heater, at least one seat ventilation, a steering wheel heater, a display, at least one seat adjustment member, at least one lighting device, or an air conditioner.

5. The vehicle of claim 4, further comprising:
a plurality of seats,
wherein the plurality of electronic devices is provided in each of the plurality of seats.

6. The vehicle of claim 4, wherein the plurality of control marks includes a control mark for pairing with the terminal, and wherein the processor is configured to control the at least one speaker, the at least one lighting device, or the display to output information being output from the terminal in response to a pairing command with the terminal.

7. The vehicle of claim 1, further comprising:
a camera; and
a microphone,
wherein the processor is configured to
recognize a gesture of a user based on an image of the user obtained by the camera,
recognize a voice of the user received by the microphone, and
control an operation of at least one electronic device of the plurality of electronic devices based on the recognized gesture and the recognized voice.

8. The vehicle of claim 7, wherein the processor is configured to:
monitor a user's state based on the image obtained by the camera and the voice received by the microphone; and
control communication with an external device or change destination information based on the monitored user's state.

9. The vehicle of claim 8, wherein the processor is configured to control an operation of at least one of at least one speaker, at least one lighting device, or a display, based on at least one of the monitored user's state or a user's state obtained from the terminal.

10. The vehicle of claim 1, wherein the processor is configured to:
perform user authentication through an application installed on the terminal; and
transfer a control authority of the plurality of electronic devices to the terminal, based on the user authentication being successful.

11. A terminal, comprising:
an inputter configured to receive a user input;
a display;
a camera;
a communication device configured to communicate with a vehicle; and
a processor configured to
recognize information about a plurality of control marks of the vehicle obtained by the camera or the communication device, control the display to display a plurality of control buttons based on the recognized information about the plurality of control marks, and
transmit information about a control button corresponding to the user input among the plurality of control buttons to the vehicle,
wherein each of the plurality of control marks is provided at a position corresponding to a location of a matched electronic device in a vehicle body and includes identification information for the matched electronic device.

12. The terminal of claim 11, wherein:
each of the plurality of control marks matches with each of a plurality of electronic devices provided in the vehicle and includes identification information of a matched electronic device; and
the user input includes control information for controlling at least one function performed in an electronic device matching with one control mark.

13. The terminal of claim 12, wherein each of the plurality of control marks is a quick response (QR) code mark or a near-field communication (NFC) mark.

14. The terminal of claim 11, wherein the plurality of control buttons includes buttons for controlling at least one operation of at least one speaker, at least one seat heater, at least one seat ventilation, a steering wheel heater, a display, at least one seat adjustment member, at least one lighting device, or an air conditioner provided in the vehicle.

15. The terminal of claim 11, wherein the processor is configured to transmit at least one of state information of a user or information being output in response to pairing with the vehicle.

16. The terminal of claim 11, wherein the processor includes an application for controlling the vehicle and is configured to perform user authentication through the application, transmit information about the user authentication to the vehicle, and receive a control authority of the vehicle from another terminal through the application.

17. The terminal of claim 11, wherein the processor is configured to:
update display of a control button in response to addition or removal of an electronic device; and
change positions of the plurality of control buttons in response to the user input.

18. The terminal of claim 11, wherein the processor is configured to perform augmented reality (AR) or virtual reality (VR) and display the plurality of control buttons through the AR or the VR being performed.

19. A vehicle control system, comprising:
a vehicle including a plurality of control marks provided to match with each of a plurality of electronic devices; and
a terminal configured to
recognize a control mark obtained by a camera or a communication device,
display a plurality of control buttons based on the recognized control mark, and
transmit information about a control button corresponding to a user input among the plurality of control buttons to the vehicle,
wherein the vehicle is configured to control an operation of an electronic device matching with the recognized control mark, based on receiving information about the control button corresponding to the user input from the terminal, and
wherein each of the plurality of control marks is provided at a position corresponding to a location of a matched electronic device in a vehicle body and includes identification information for the matched electronic device.

20. The vehicle control system of claim 19, wherein each of the plurality of control marks is a quick response (QR) code mark or a near-field communication (NFC) mark.

\* \* \* \* \*